US012253713B2

United States Patent
Wang et al.

(10) Patent No.: US 12,253,713 B2
(45) Date of Patent: Mar. 18, 2025

(54) DISPLAY MODULE AND DISPLAY APPARATUS

(71) Applicants: Beijing BOE Display Technology Co., Ltd., Beijing (CN); BOE Technology Group Co., Ltd., Beijing (CN)

(72) Inventors: Tengfei Wang, Beijing (CN); Zheng Wang, Beijing (CN); Hetao Wang, Beijing (CN); Rui Guo, Beijing (CN); Shixin Geng, Beijing (CN); Jin Han, Beijing (CN); Tianyang Han, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/291,602

(22) PCT Filed: Jul. 1, 2022

(86) PCT No.: PCT/CN2022/103383
§ 371 (c)(1),
(2) Date: Jan. 24, 2024

(87) PCT Pub. No.: WO2023/005603
PCT Pub. Date: Feb. 2, 2023

(65) Prior Publication Data
US 2025/0004191 A1    Jan. 2, 2025

(30) Foreign Application Priority Data

Jul. 26, 2021   (CN) .......................... 202110845149.X

(51) Int. Cl.
*F21V 8/00*        (2006.01)

(52) U.S. Cl.
CPC ......... *G02B 6/0095* (2013.01); *G02B 6/0055* (2013.01); *G02B 6/0066* (2013.01)

(58) Field of Classification Search
CPC ... G02B 6/0095; G02B 6/0055; G02B 6/0066
See application file for complete search history.

(56) References Cited

U.S. PATENT DOCUMENTS

2015/0146113 A1    5/2015  Kasai
2015/0362787 A1   12/2015  Yuan et al.
(Continued)

FOREIGN PATENT DOCUMENTS

| CN | 1648731 A | 8/2005 |
|----|-----------|--------|
| CN | 101441340 A | 5/2009 |

(Continued)

OTHER PUBLICATIONS

English Machine Translation of Jia et al CN 104 763 944 (Year: 2024).*

(Continued)

*Primary Examiner* — Donald L Raleigh
(74) *Attorney, Agent, or Firm* — XSENSUS LLP

(57) ABSTRACT

Provided is a display module. The display module includes: a backplane, a middle frame, a backlight module, and a display panel; wherein the backlight module and the display panel are sequentially laminated on the backplane; the middle frame includes a first frame body and a bearing structure, wherein the first frame body surrounds the backlight module, the bearing structure is disposed on the first frame body and extends in a direction towards a center of the backlight module, and the backlight module and the display panel are respectively disposed on two faces of the bearing structure; and the backlight module includes a light guide plate, and the display module has a view angle greater than or equal to 45° on at least one side of the display module.

20 Claims, 22 Drawing Sheets

(56) References Cited

U.S. PATENT DOCUMENTS

| | | |
|---|---|---|
| 2016/0018690 A1 | 1/2016 | Chen |
| 2017/0199592 A1 | 7/2017 | Chien et al. |
| 2018/0136497 A1 | 5/2018 | Wang et al. |
| 2020/0348547 A1 | 11/2020 | Tsai et al. |
| 2023/0032572 A1 | 2/2023 | Wang et al. |

FOREIGN PATENT DOCUMENTS

| | | | | |
|---|---|---|---|---|
| CN | 101737735 A | 6/2010 | | |
| CN | 102116439 A | 7/2011 | | |
| CN | 102352991 A | 2/2012 | | |
| CN | 202330931 U | 7/2012 | | |
| CN | 103698937 A | 4/2014 | | |
| CN | 103791467 A | 5/2014 | | |
| CN | 104062782 A | 9/2014 | | |
| CN | 104763944 A | * 7/2015 | ................ | F21S 8/00 |
| CN | 205485162 U | 8/2016 | | |
| CN | 108074483 A | 5/2018 | | |
| CN | 209746312 U | 12/2019 | | |
| CN | 210349098 U | 4/2020 | | |
| CN | 211528872 U | 9/2020 | | |
| CN | 212410992 A | 1/2021 | | |
| CN | 212723610 U | 3/2021 | | |
| CN | 216387644 U | 4/2022 | | |
| KR | 2015-0069668 A | 6/2015 | | |

OTHER PUBLICATIONS

International Search Report and Written Opinion mailed on Oct. 9, 2022, in corresponding PCT/CN2022/103383, 20 pages.

\* cited by examiner

DISPLAY MODULE AND DISPLAY APPARATUS

CROSS-REFERENCE TO RELATED APPLICATIONS

This application is a U.S. national stage of international application No. PCT/CN2022/103383, filed on Jul. 1, 2022, which is based on and claims priority to Chinese Patent Application No. 202110845149.X filed on Jul. 26, 2021, and entitled "DISPLAY MODULE AND DISPLAY DEVICE," and the disclosures of each are herein incorporated by references in their entireties.

TECHNICAL FIELD

The present disclosure relates to the field of display technologies, and in particular, relates to a display module and a display device.

BACKGROUND OF THE INVENTION

A display module is a device capable of providing a display function, and is applicable to scenarios including an indoor environment, an outdoor environment and various in-vehicles environments.

SUMMARY OF THE INVENTION

Embodiments of the present disclosure provide a display module and a display device. The technical solutions are as follows.

According to some embodiments of the present disclosure, a display module is provided. The display module includes: a backplane, a middle frame, a backlight module, and a display panel, wherein the backlight module and the display panel are sequentially laminated on the backplane;

the middle frame includes a first frame body and a bearing structure, wherein the first frame body surrounds the backlight module, the bearing structure is disposed on the first frame body and extends in a direction towards a center of the backlight module, and the backlight module and the display panel are respectively disposed on two faces of the bearing structure; and the backlight module includes a light guide plate, and the display module has a view angle greater than or equal to 45° on at least one side of the display module, wherein the view angle is a smaller one in a first angle and a second angle, the first angle being an included angle between a first link line and a normal line, and the second angle is an included angle between a second link line and a normal line, wherein on the at least one side of the display module, the first link line is a line between a first point on an edge of a light exiting face of the light guide plate and a second point on an edge of a display region of the display panel, the normal line is a straight line passing through the second point and perpendicular to the display region, the second link line is a line between a third point on an edge of a side, proximal to the backlight module, of the bearing structure and the second point, the first link line, the second link line, and the normal line are in a plane, and an extension direction of the edge of the display region of the second point is perpendicular to the plane of the first link line, the second link line, and the normal line. In some embodiments, the view angle ranges from 55° to 65°.

In some embodiments, the display module further includes a control line electrically connected to a first side of the display panel, wherein a length of the bearing structure on the first side of the display panel in an extension direction is greater than lengths of the bearing structure on sides other than the first side of the display panel in the extension direction.

In some embodiments, the display module further includes a buffer structure, wherein the buffer structure includes a first buffer structure between the middle frame and the backlight module, and a second buffer structure between the middle frame and the display panel, wherein the first buffer structure is adjacent to the middle frame and the backlight module, and the second buffer structure is adjacent to the middle frame and the display panel.

In some embodiments, the first buffer structure is attached to a face, proximal to the backlight module, of the bearing structure, and the second buffer structure is attached to a face, proximal to the display panel, of the bearing structure.

In some embodiments, the backlight module further includes a film material, wherein the film material is disposed on the light exiting face of the light guide plate, an orthogonal projection of the film material on a plane of the light guide plate is within the light guide plate, and at least one side of the light guide plate includes an edge region not covered by the film material; and an attaching region and a bearing boss are disposed on a face, facing towards the backlight module, of the bearing structure, and the first buffer structure includes a first buffer sub-structure on the attaching region and a second buffer sub-structure on the bearing boss, wherein the first buffer sub-structure is adjacent to the film material, and the second buffer sub-structure is in contact with the edge region of the light guide plate.

In some embodiments, the backplane includes a plate body and a side wall extending from an edge of the plate body, and the buffer structure further includes at least one L-shaped buffer structure, wherein the L-shaped buffer structure is disposed on the plate body of the backplane and is disposed between at least one corner of the backlight module and the side wall of the backplane.

In some embodiments, a number of the L-shaped buffer structures is four.

In some embodiments, the backlight module further includes a reflecting sheet on a face, distal from the display panel, of the light guide plate, wherein an abdication structure matching the L-shaped buffer structure is disposed on at least one corner of the reflecting sheet.

In some embodiments, the display module further includes a frame, wherein the frame includes an outer frame and a second frame body, wherein the outer frame surrounds the middle frame and the backplane, the second frame body extends from an edge of the outer frame to the center of the backlight module, the display panel and the backlight module are disposed on a same side of the second frame body, and the buffer structure further includes a third buffer structure on a face, proximal to the display panel, of the second frame body.

In some embodiments, the display module further includes a frame, wherein the frame includes an outer frame and a second frame body, the outer frame surrounding the middle frame and the backplane;

the backplane includes a plate body and a side wall extending from an edge of the plate body; and the display device further includes a fixing screw, wherein the fixing screw passes through the second frame body and the side wall of the backplane to fix the second frame body and the side wall.

In some embodiments, in a direction perpendicular to a display face of the display panel, a distance between the second frame body and the display panel ranges from 0.1 mm to 1 mm.

In some embodiments, the backplane includes a plate body and a side wall extending from an edge of the plate body, wherein the side wall includes a protrusion structure; and
- an opening is disposed in the first frame body, wherein the protrusion structure is configured to be inserted in the opening in the first frame body to connect the middle frame and the backplane.

In some embodiments, the backlight module further includes a light emitting assembly disposed on a side face of the light guide plate, wherein the light emitting assembly is not overlapped with an orthogonal projection of the light guide plate on a plane of the light exiting face of the light guide plate, and
- the light emitting assembly includes a strip-shaped light emitting chip bearing substrate, a stop block, and a plurality of light emitting chips on the light emitting chip bearing substrate, wherein one side of the stop block is in contact with the light emitting chip bearing substrate, the other side of the stop block is in contact with the side face of the light guide plate, and a size of the stop block is greater than a size of the light emitting chip in a direction perpendicular to the side face of the light guide plate.

In some embodiments, the display module further includes a frame, and a reinforcement protrusion is disposed on at least one corner of the middle frame, wherein a reinforcement opening matching the reinforcement protrusion is disposed on at least one corner of the frame, the frame surrounds the middle frame, and the reinforcement protrusion is disposed in the reinforcement opening.

In some embodiments, the backlight module further includes a film material, wherein the film material is disposed on the light exiting face of the light guide plate,
- at least one stop protrusion is disposed at an edge of the film material, the backplane includes at least one stop opening in one to one correspondence to the at least one stop protrusion, wherein the stop protrusion is disposed in the stop opening.

In some embodiments, the backplane includes a plate body and a side wall extending from an edge of the plate body, wherein the side wall surrounds the backlight module, and
- a reference region and a non-reference region recessed towards the backlight module are disposed on a face, distal from the backlight module, of the plate body, wherein the reference region includes a first reference region on the edge of the plate body and a second reference region surrounded by the non-reference region, and a flatness of the reference region ranges from 1.1 mm to 0.2 mm.

In some embodiments, the display module is rectangular, and a ratio of a length to a width of the display module is greater than or equal to 5:1.

In some embodiments of the present disclosure, a display device is provided. The display device includes a control assembly and any one of the above display module.

In some embodiments, the display device is a vehicle-mounted display device.

BRIEF DESCRIPTION OF DRAWINGS

For clearer description of the technical solutions in the embodiments of the present disclosure, the following briefly describes the accompanying drawings required for describing the embodiments. Apparently, the accompanying drawings in the following description show merely some embodiments of the present disclosure, and those of ordinary skill in the art may still derive other drawings from these accompanying drawings without any creative efforts.

Clear embodiments of the present disclosure are shown by the above accompanying drawings, and more detailed descriptions are shown hereinafter. The accompanying drawings and texts are not intended to limit the scope of the concept of the present disclosure in any way, but to describe the concept of the present disclosure for those skilled in the art with reference to specific embodiments.

DETAILED DESCRIPTION OF THE INVENTION

To make the objectives, technical solutions, and advantages of the present disclosure clearer, the embodiments of the present disclosure are further described in detail hereinafter with reference to the accompanying drawings.

At present, the display module generally includes a backplane, a middle frame, a backlight module, and a display panel. The backlight module is disposed on the backplane, the display panel is disposed on the middle frame, and the middle frame is configured to bear the display panel.

However, conventionally, the display device generally does not take impact of a view angle into consideration, and thus the view angle of the display device is less.

Figure 1:
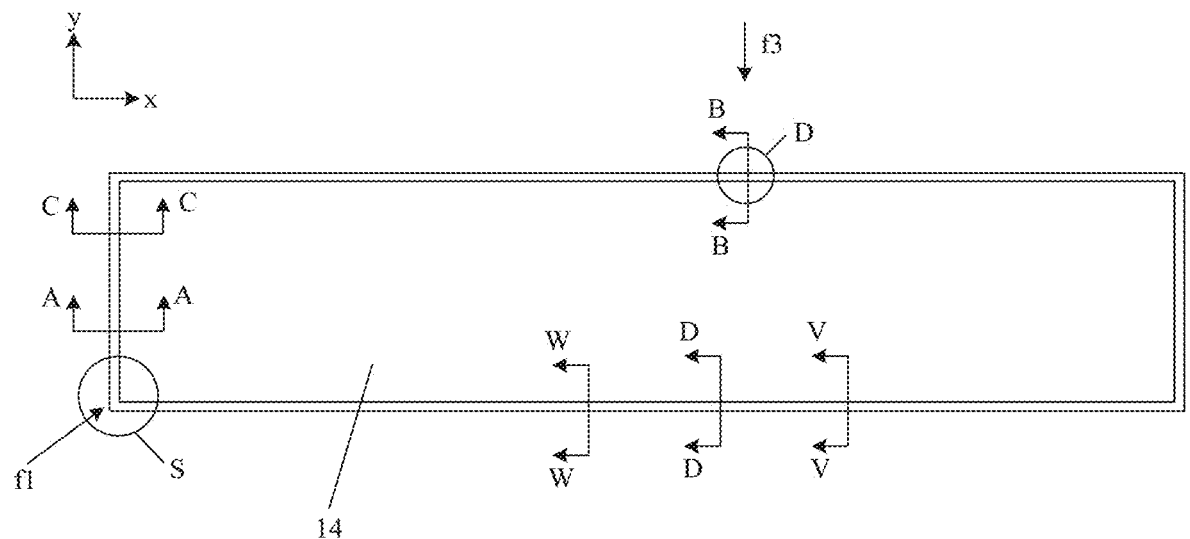
FIG. 1 is a front view of a display module according to some embodiments of the present disclosure.

As shown in FIG. 1, FIG. 1 is a front view of a display module according to some embodiments of the present disclosure (the front view is a schematic diagram of the display module viewed from a face of the display module displaying images). A direction x is a direction parallel to one side of the display module, and a direction y is a direction parallel to the other side of the display module. For example, in the case that the display module is rectangular, the direction x is a direction parallel to a longer side of the display module, and the direction y is a direction parallel to a shorter side of the display module.

Figure 2:
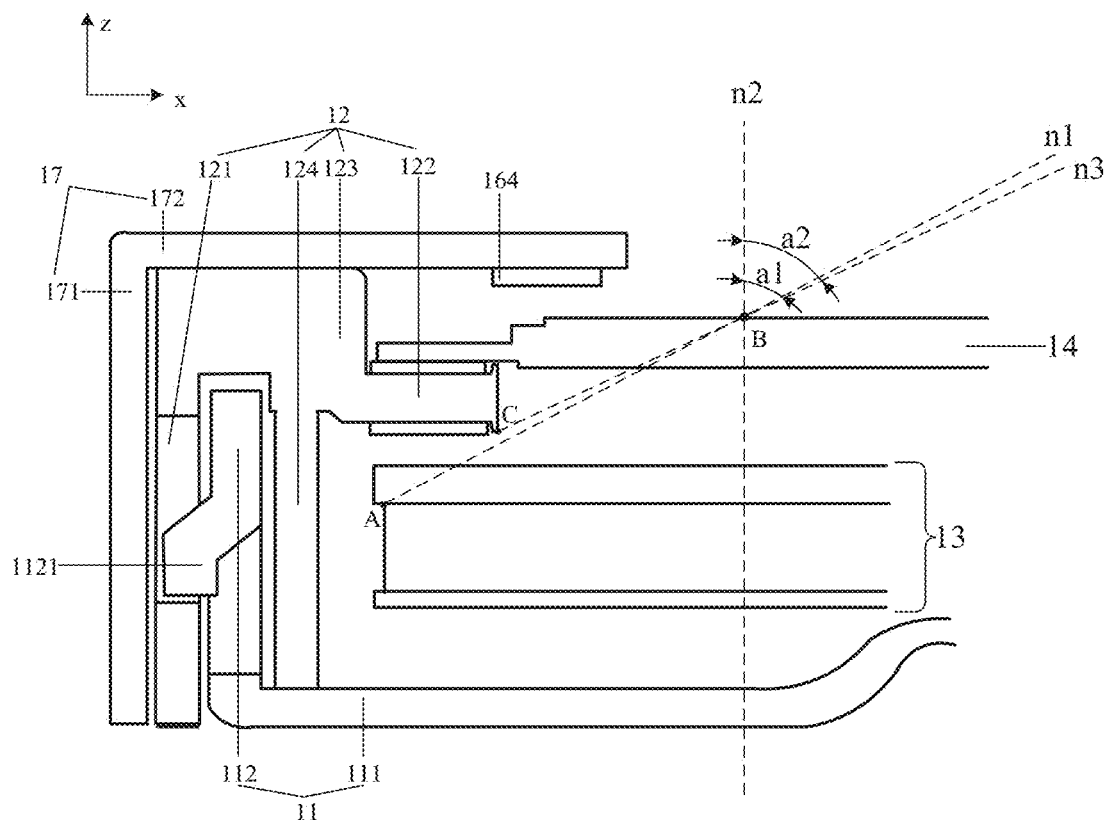
FIG. 2 is a schematic structural diagram of a section of the display module shown in FIG. 1 at a position of A-A.

As shown in FIG. 2, FIG. 2 is a schematic structural diagram of a section of the display module shown in FIG. 1 at a position of A-A. A direction z is a direction perpendicular to a display face of the display module, and the direction z is a direction perpendicular to the paper in FIG. 1.

The display module 10 includes a backplane 11, a middle frame 12, a backlight module 13, and a display panel 14, and the backlight module 13 and the display panel 14 are sequentially laminated on the backplane 11.

The middle frame 12 includes a first frame body 121 and a bearing structure 122. The first frame body 121 surrounds the backlight module 13, the bearing structure 122 is disposed on the first frame body 121 and extends in a direction towards a center of the backlight module 13, and the backlight module 13 and the display panel 14 are respectively disposed on two faces of the bearing structure 122. The backlight module 13 includes a light guide plate 131.

It should be noted that the bearing structure 122 extending in the direction towards the center of the backlight module 13 indicates that an extension direction of the bearing structure is parallel to the display face of the display panel and faces towards an inner of the display panel.

The display module 10 includes a display region and a non-display region. The display region and the non-display region include a closed interface profile. The interface profile is a polygon, for example, a triangle, a quadrilateral, a hexagon, an octagon, and the like. In the case that the interface profile is a polygon, at least one side of the display module 10 can be understood as at least one edge of the polygon. In some embodiments, the closed interface profile included in the display region and the non-display region is a circle, an oval, or other closed shapes including curves. In the case that the interface profile includes a curve segment, at least one side of the display module 10 includes at least partial segment of the curve. In the case that the enclosed shape includes a straight line segment, at least one side of the display module 10 includes at least partial segment of the straight line segment.

In the case that the display module 10 is in a rectangular shape, at least one side indicates at least one of an upper side, a lower side, a left side, and a right side of the display module, and may include multiple sides.

The display module 10 has a view angle greater than or equal to 45°. The view angle is a smaller one in a first angle a1 and a second angle a2. It can be seen from FIG. 2 that the first angle a1 is an included angle between a first link line n1 and a normal line n2, and the second angle a2 is an included angle between a second link line n3 and a normal line n2. On the at least one side of the display module 10, the first link line n1 is a line between a first point A on an edge of a light exiting face of the light guide plate 131 and a second point B on an edge of the display region of the display panel v14, the normal line n2 is a straight line passing through the second point B and perpendicular to the display region, the second link line n3 is a line between a third point on an edge of a side, proximal to the backlight module, of the bearing structure 122 and the second point B, the first link line n1, the second link line n3, and the normal line n2 are in a plane, and an extension direction of the edge of the display region of the second point B is perpendicular to the plane of the first link line n1, the second link line n3, and the normal line n2.

It should be noted that in the case that the edge of the display region of the second point B is a straight line segment, a straight line of the straight line segment is perpendicular to the plane of the first link line n1, the second link line n3, and the normal line n2. In the case that the edge of the display region of the second point B is a curve segment, a tangent line of the curve segment at the second point B is perpendicular to the plane of the first link line n1, the second link line n3, and the normal line n2.

It should be noted that in the case that the display panel is a curved display panel, the normal line n2 is a straight line perpendicular to a tangent plane of the curved face at the second point B.

It can be understood that the backlight module 13 is an edge lighting backlight module or a bottom lighting backlight module.

FIG. 2 shows a case where the first angle a1 is less than the second angle a2. In this case, the bearing structure 122 of the middle frame 12 does not affect the view angle, and thus the view angle is the first angle a1.

Figure 3:
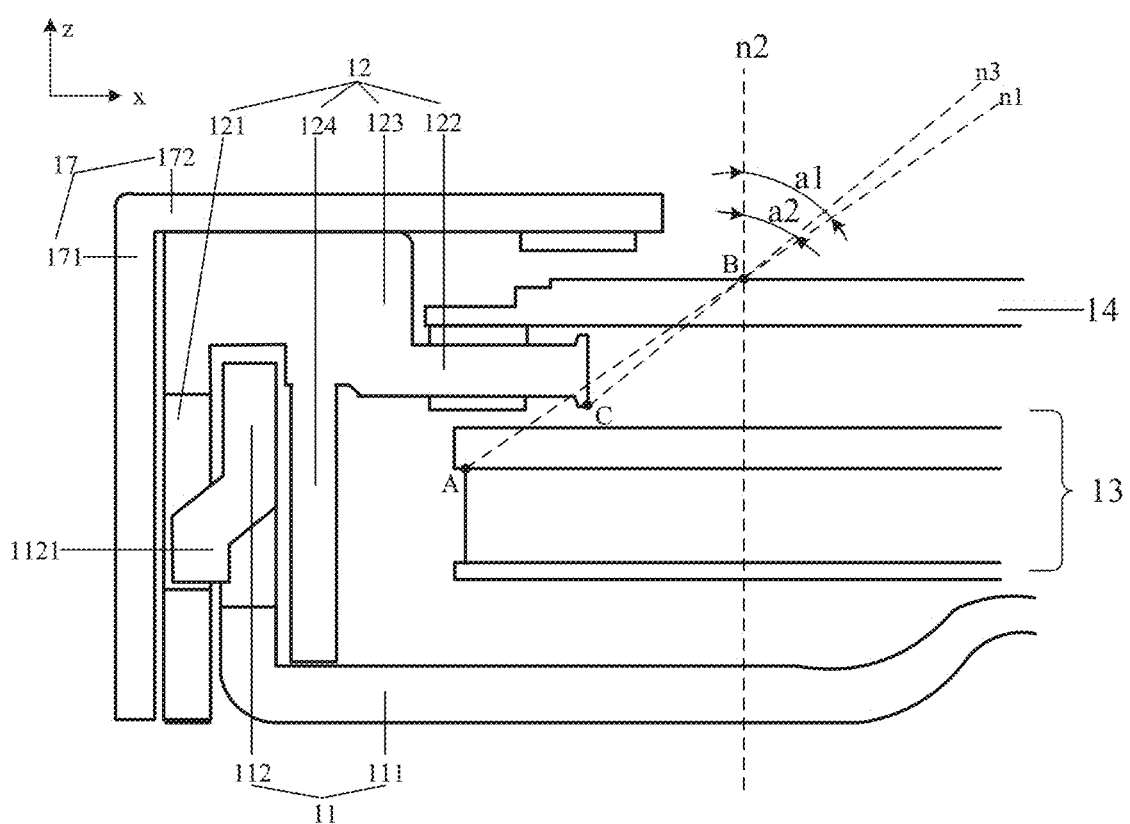
FIG. 3 is another schematic structural diagram of a section of the display module shown in FIG. 1 at a position of A-A.

However, lengths of the bearing structure 122 of the middle frame 12 are different in different display module. In the case that the bearing structure 122 is long (that is, a length of the bearing structure in an extension direction of the bearing structure is great), emission of light from the light guide plate 131 to the display region of the display panel 14 is affected. Illustratively, FIG. 3 shows another schematic structural diagram of a section of the display module shown in FIG. 1 at a position of A-A. The first angle a1 is greater than the second angle a2. In this case, the bearing structure 122 of the middle frame 12 affects the view angle, and thus the view angle is the second angle a2.

In summary, a display module is provided in the embodiments of the present disclosure. The display module includes a backplane, a middle frame, a backlight module, and a display panel. By setting angles between a bearing structure in the middle frame, a light guide plate, and an edge of the display panel, the display module has a view angle greater than or equal to 45°, such that the view angle of the display module is great, which facilitates viewing the display module at various angles by a user, solves a problem of less view angle of the display module in some practices, and achieves an effect of increasing the view angle of the display module.

In addition, the view angle of the display module in the embodiments of the present disclosure is great, such that the display module is applicable to more scenarios, for example, various vehicles, various outdoor scenarios, and the like, the user can view the display module at a lower view angle and other angles, and a use range is wide.

In some embodiments, on each side of the display module, the display module 10 has the view angle greater than or equal to 45°. For example, in the case that the display module 10 is in a rectangular shape, view angles of the upper side, the lower side, the left side, and the right side of the display module are greater than or equal to 45°. In some embodiments, the view angles of the upper side, the lower side, the left side, and the right side of the display module are equal.

Figure 4:
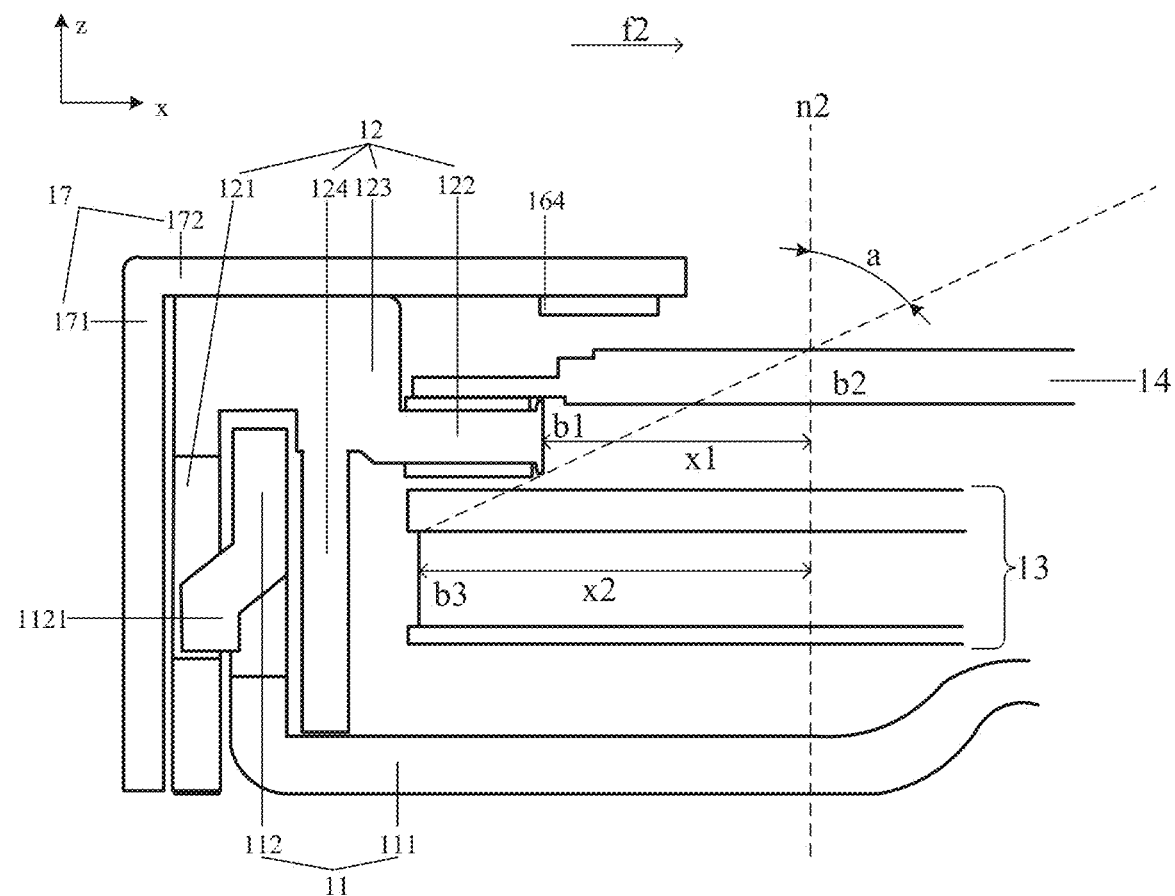
FIG. 4 is another schematic structural diagram of a section of the display module shown in FIG. 1 at a position of A-A.

As shown in FIG. 4, FIG. 4 is another schematic structural diagram of a section of the display module shown in FIG. 1 at a position of A-A. The view angle a ranges from 55° to 65°. For example, the view angle a is one of 55°, 60°, and 65°. The range of the view angle is great, and thus meets a requirement of viewing screens display on the display module at a low view angle by the user. For example, in the case that the display module is disposed on a vehicle (for example, a subway or a bus), the display module is generally disposed on a higher position of the vehicle, and the user views the display module at a low view angle. In the case that the view angle ranges from 55° to 65°, the user clearly views the screens displayed on the display module. The view angle is a maximum angle between light of sight of the user and the normal line of the display module in positions at which the user may view the screens display on the display module.

In some embodiments, on each side of the display module, the view angle of the display module 10 ranges from 55° to 65°. For example, in the case that the display module 10 is in a rectangular shape, the view angles of the upper side, the lower side, the left side, and the right side of the display module range from 55° to 65°. In some embodiments, the view angles of the upper side, the lower side, the left side, and the right side of the display module are equal.

In some embodiments, a length of the bearing structure 122 on a first side of the display panel 14 in the extension direction is greater than lengths of the bearing structure 122 on sides other than the first side of the display panel 14 in the extension direction. The first side is a side on which the display panel is electrically connected to a control circuit. For example, the first side is the upper side. The control circuit is a flexible circuit, for example, a flexible printed circuit (FPC), and the like, and is configured to connect a control assembly (the control assembly includes a processor, a control circuit, and the like) in the display module to the display panel. On the first side, a frame of the display panel is wide, and thus a longer bearing structure is accordingly disposed to bear the display panel.

In some embodiments, on the first side (the upper side in the embodiments of the present) of the display module 10, the length of the bearing structure 122 in the extension direction ranges from 6 mm to 10 mm, for example, 8 mm. On the lower side of the display module 10, the length of the bearing structure 122 in the extension direction ranges from 3 mm to 8 mm, for example, 4.8 mm. On the left side of the display module 10, the length of the bearing structure 122 in the extension direction ranges from 3 mm to 8 mm, for example, 3.8 mm. On the right side of the display module 10, the length of the bearing structure 122 in the extension direction ranges from 3 mm to 8 mm, for example, 4 mm.

It should be noted that, referring to FIG. 4, the display panel 14 includes a display region and a peripheral region surrounding the display region. On different sides of the display module, distances x1 between an edge b1, proximal to the display panel 14, of the bearing structure 122 and an edge b2 of the display region of the display panel 14 in the extension direction f2 (the extension direction f2 is parallel to a light exiting face of the display panel 14, and is perpendicular to the edge b2 of the display region) of the bearing structure 122 are equal, and the distance x1 is a distance for preventing the light from the backlight module 13 from leaking from the peripheral region. In addition, on different sides of the display module, distances x2 between an edge b3 of the light guide plate 131 and the edge b2 of the display region in the extension direction f2 are equal. The view angle is determined based on the distances x1 and x2.

Figure 5:
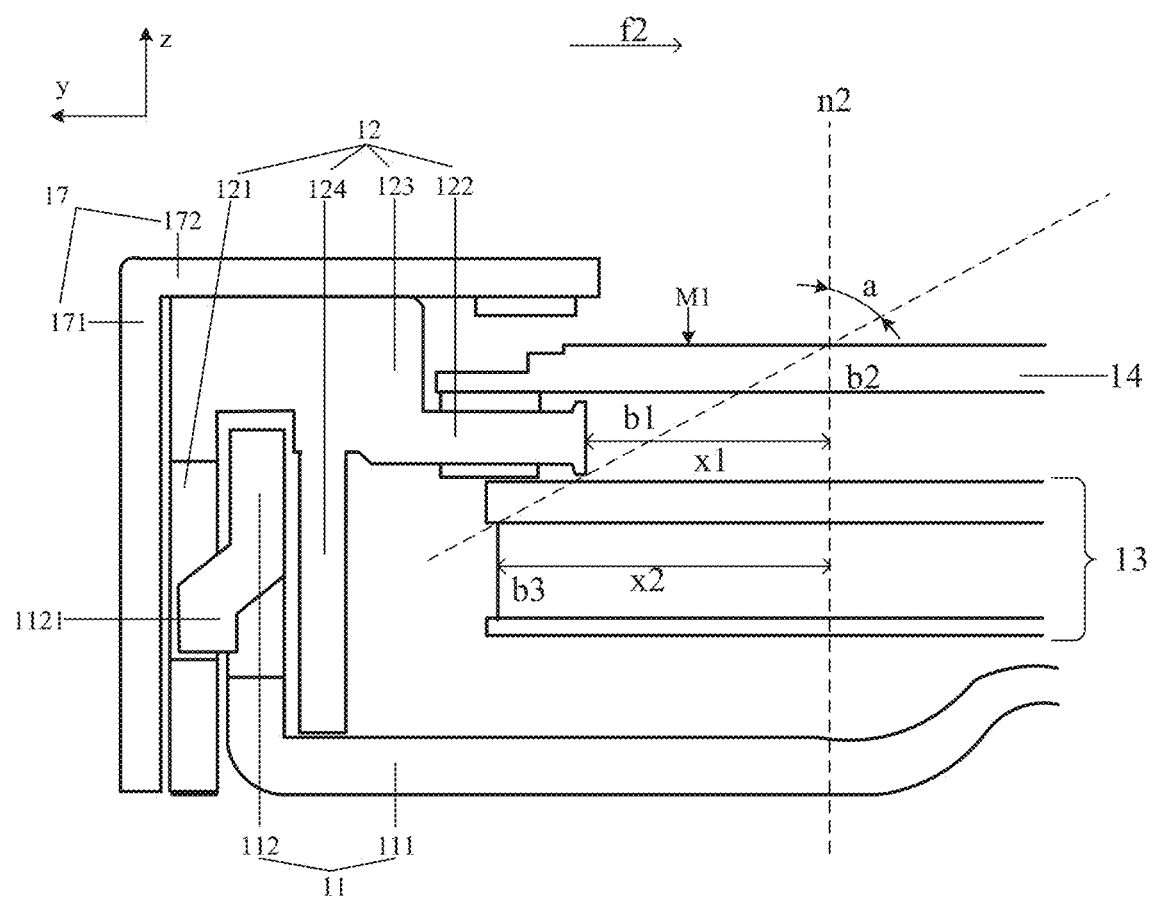
FIG. 5 is another schematic structural diagram of a section of the display module shown in FIG. 1 at a position of B-B.

However, on different sides of the display panel, widths of the peripheral region are different, and the lengths of the bearing structure 122 of the middle frame 12 on different sides are different (for example, in the above embodiments, as the upper side of the display panel is provided with a structure connected to the control circuit, a width of the peripheral region on the upper side of the display panel is great, and a length of the bearing structure 122 of the middle frame 12 on the upper side is great) for enough space for bearing the portion of the peripheral region of the display panel. However, as the distances x1 and x2 are not changed, the view angle is not affected. Illustratively, FIG. 5 is another schematic structural diagram of a section of the display module shown in FIG. 1 at a position of B-B. A length of the bearing structure 122 in FIG. 5 is obviously greater than the length of the bearing structure 122 in FIG. 4. As the distances x1 and x2 are not changed, the view angles of the display modules in FIG. 5 and FIG. 4 are equal.

It should be noted that the above description illustrates a reason of a difference in length of the bearing structure. In practical implementation, on different sides of the display module, x1 may be different, and x2 may be different, as long as requirements of the view angle on the side are met, which is not limited in the embodiments of the present disclosure.

Figure 6:
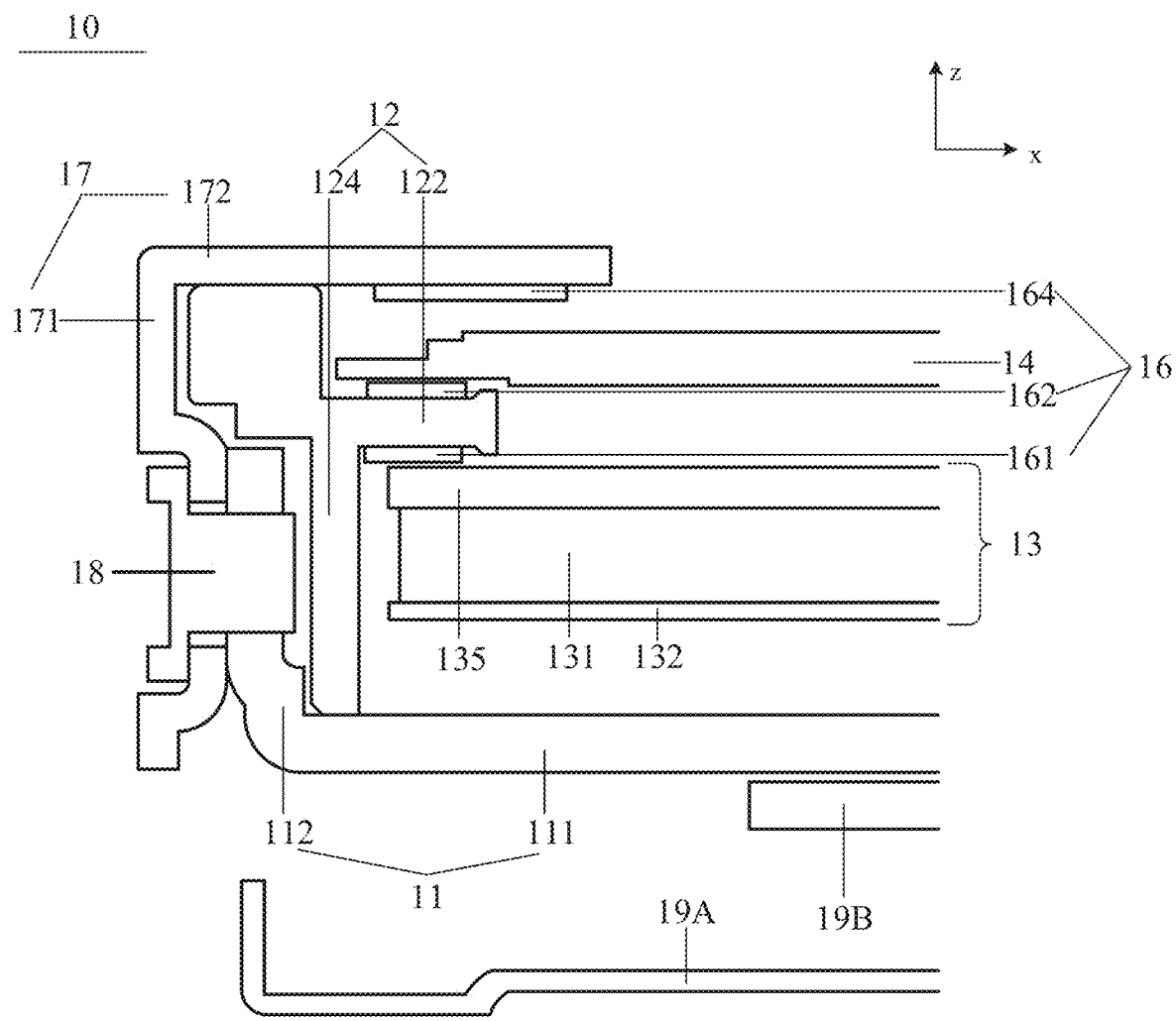
FIG. 6 is another schematic structural diagram of a section of the display module shown in FIG. 1 at a position of C-C.

FIG. 6 is another schematic structural diagram of a section at a position of C-C shown in FIG. 1.

The display module further includes a buffer structure 16. The buffer structure 16 includes a first buffer structure 161 between the middle frame 12 and the backlight module 13, and a second buffer structure 162 between the middle frame 12 and the display panel 14. The first buffer structure 161 is adjacent to the middle frame 12 and the backlight module 13, and the second buffer structure 162 is adjacent to the middle frame 12 and the display panel 14. Being adjacent indicates in direct contact or being disposed with a space. For example, the space is filled with air. In some embodiments, the first buffer structure 161 is in direct contact with the middle frame 12, and a distance of the space between the first buffer structure 161 and a film material of the backlight module 13 ranges from 0.11 mm to 0.3 mm, for example, 0.15 mm. In some embodiments, the second buffer structure 162 is in direct contact with the middle frame 12 and the display panel 14. The buffer structure 16 is disposed between various assemblies to prevent the assemblies from colliding with each other, such that an effect of vibration of the display device on the assemblies in the use of the display device is reduced, and the seismic property of the display device is improved.

In some embodiments, the buffer structure 16 is made of a rubber, silicone, or polyethylene terephthalate (PET). The rubber is elastic, wear-resistant, and not prone to deflation. The silicone is a material with high elasticity, anti-static, and high temperature resistance. PET is a material with great mechanical properties, strong impact resistance, great folding property, and high transparency.

In some embodiments, the first buffer structure 161 is attached to a face, proximal to the backlight module 13, of the bearing structure 122, and the second buffer structure 162 is attached to a face, proximal to the display panel 14, of the bearing structure 122. By attaching the first buffer structure 161 to the face, proximal to the backlight module 13, of the bearing structure 122, and the second buffer structure 162 to the face, proximal to the display panel 14, of the bearing structure 122, the buffer function on the display panel 14 and the backlight module 13 are achieved, such that the backlight module 13 and display panel 14 are prevented from being damaged in the case that the backlight module 13 and display panel 14 are shook to hit the bearing structure 122 in the vehicle-mounted scenarios.

Figure 7:
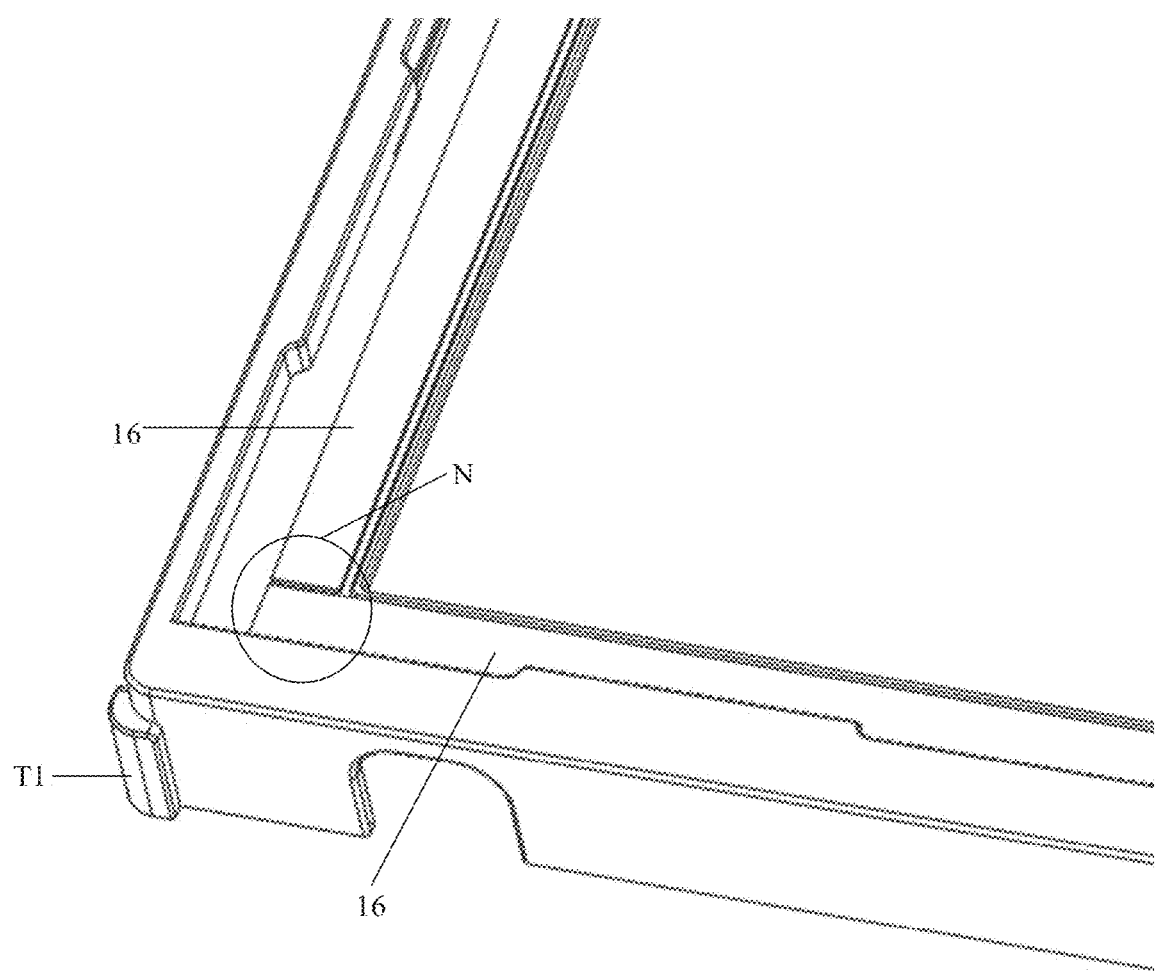
FIG. 7 is a schematic diagram of a middle frame in a region S in the display module shown in FIG. 1.
Figure 8:
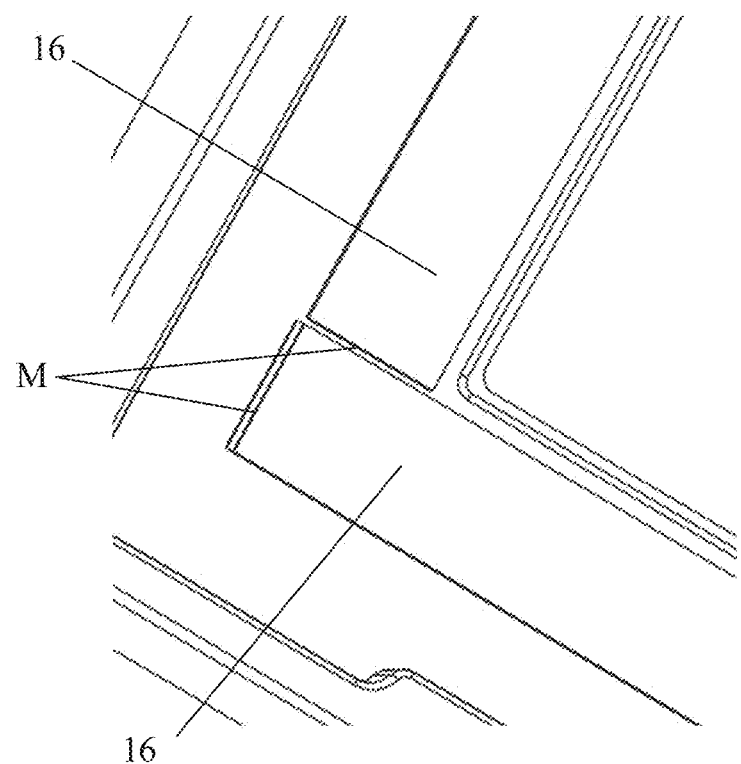
FIG. 8 is an enlarged diagram of a region N shown in FIG. 7.
Figure 9:
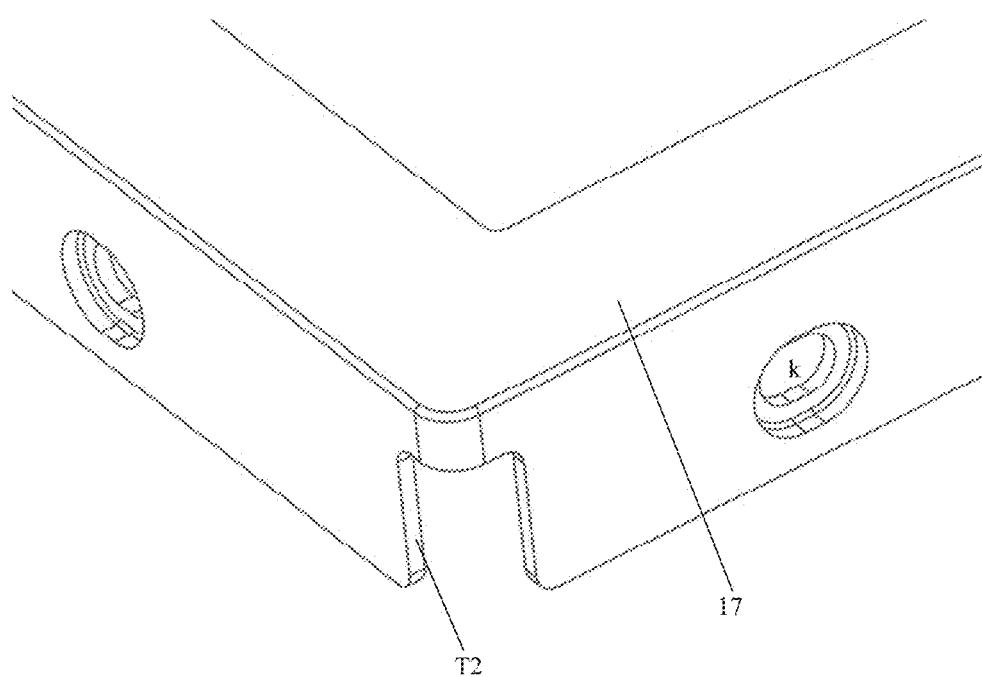
FIG. 9 is a locally schematic structural diagram of the frame at f1 shown in FIG. 1.
Figure 10:
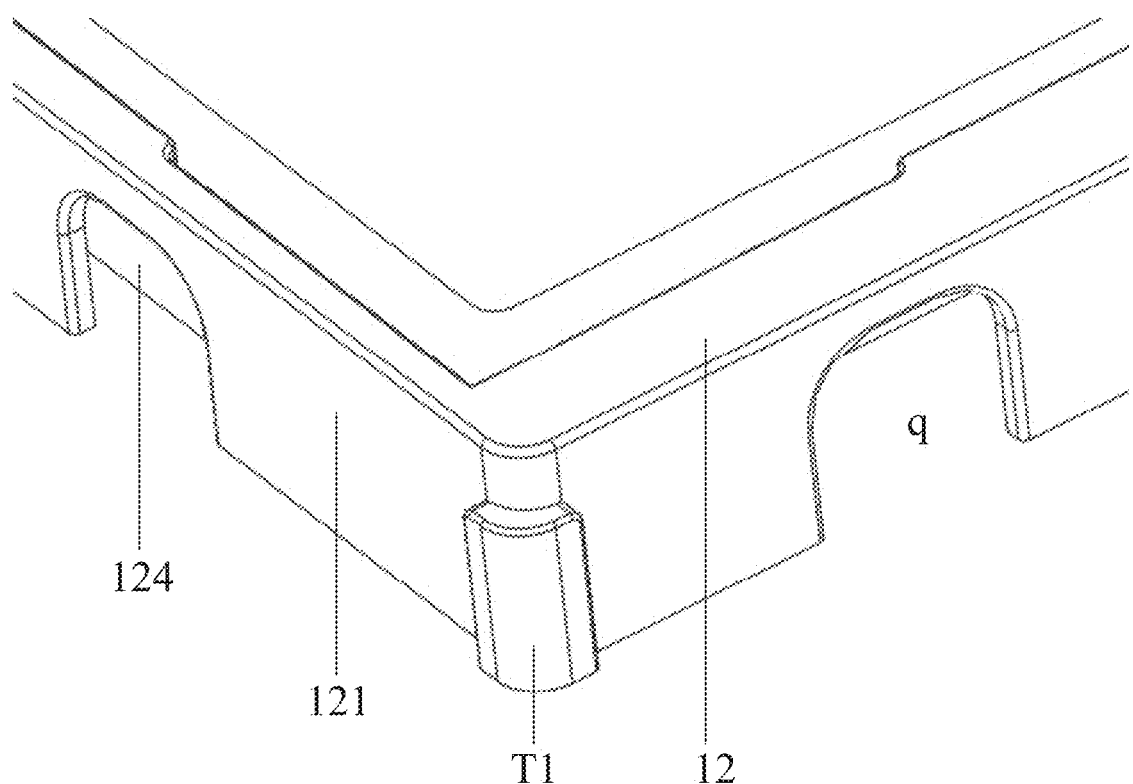
FIG. 10 is a locally schematic structural diagram of the middle frame at f1 shown in FIG. 1.
Figure 11:
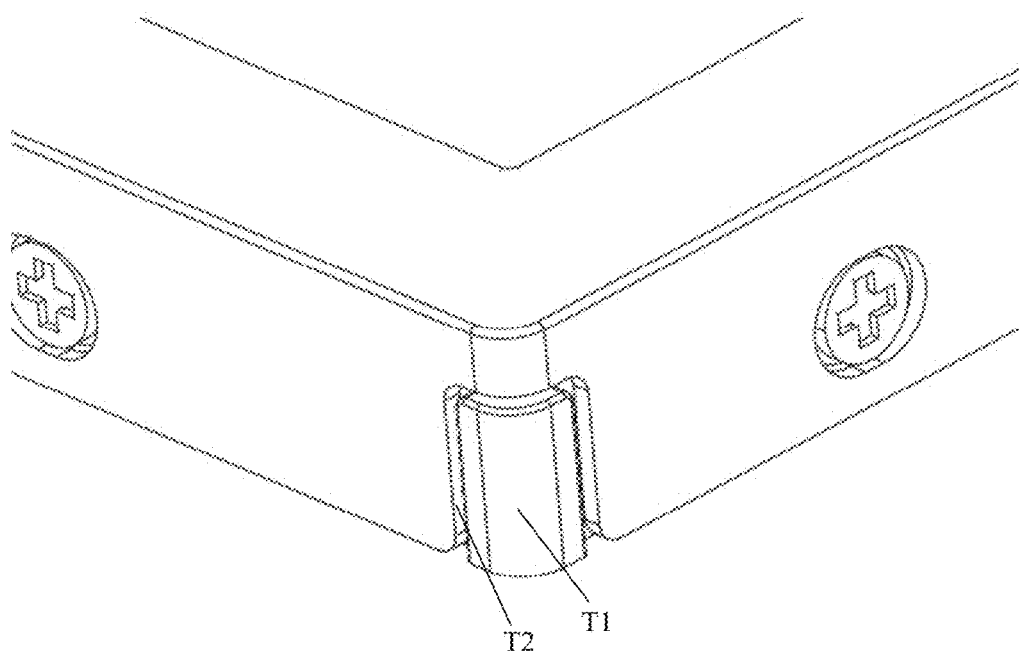
FIG. 11 is a schematic structural diagram of the frame matching the middle frame at f1 shown in FIG. 1.

In some embodiments, as show in FIG. 7, FIG. 7 is a schematic diagram of a middle frame in a region S in the display module shown in FIG. 1. As shown in FIG. 8, FIG. 8 is an enlarged diagram of a region N shown in FIG. 7, and an aligning mark is attached on the bearing structure 122 to position the buffer structure. As shown in FIG. 9, FIG. 9 is a locally schematic structural diagram of the frame at f1 shown in FIG. 1. As shown in FIG. 10, FIG. 10 is a locally schematic structural diagram of the middle frame at f1 shown in FIG. 1. As shown in FIG. 11, FIG. 11 is a schematic diagram of a reinforcement structure of the frame matching the middle frame at f1 shown in FIG. 1. Referring to FIG. 9, FIG. 10, and FIG. 11, the display device further includes a frame 17, and a reinforcement protrusion T1 is disposed on at least one corner of the middle frame 12. A reinforcement opening T2 matching the reinforcement protrusion T1 is disposed on at least one corner of the frame 17, the frame 17 surrounds the middle frame 12, and the reinforcement protrusion T1 is disposed in the reinforcement opening T2.

In some embodiments, the reinforcement protrusion T1 is disposed on all four corners of the frame 17, and the reinforcement opening T2 matching the reinforcement protrusion T1 of the middle frame 12 is disposed on the frame 17, such that the frame 17 and the middle frame 12 are closely fixed, and the strength and appearance of the middle frame and the frame are improved.

Figure 12:
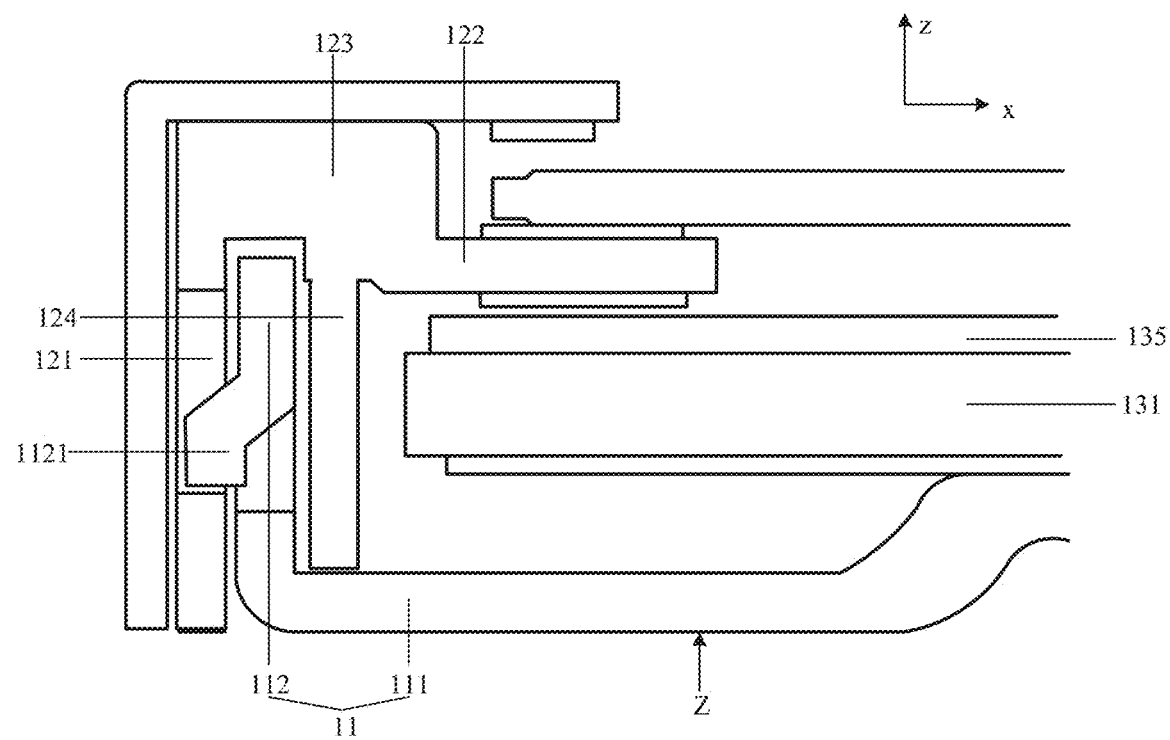
FIG. 12 is a schematic structural diagram of a section of the display module shown in FIG. 1 at a position of A-A.
Figure 13:
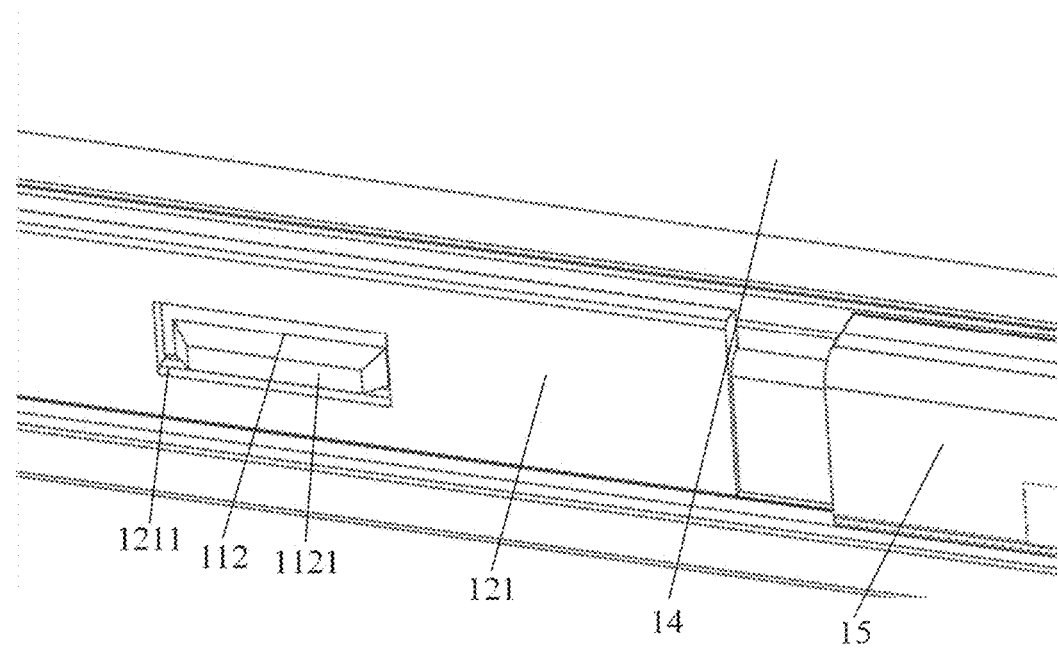
FIG. 13 is a schematic structural diagram of the middle frame in a region D viewed at f3 in the display module shown in FIG. 1.

Referring to FIG. 12 and FIG. 13, FIG. 12 is a schematic structural diagram of a section of the display module shown in FIG. 1 at a position of A-A, and FIG. 13 is a schematic structural diagram of the middle frame in a region D viewed at f3 in the display module shown in FIG. 1.

The backplane 11 includes a plate body 111 and a side wall 112 extending from an edge of the plate body 111. The side wall 112 includes a protrusion structure 1121, and an opening 1211 is disposed in the first frame body 121. The protrusion structure 1121 is configured to be inserted in the opening 1211 in the first frame body 121 to connect the middle frame 12 to the backplane 11. The backplane 11 is affixed to the middle frame 12 by inserting the protrusion structure 1121 on the side wall 112 in the opening 1211 in the first frame body 121 of the middle frame 12, such that the backplane 11 is prevented from moving in a direction away from or towards the display panel 14, and a stability of the structure of the display module is ensured.

The middle frame 12 further includes a step structure 123 and a third frame body 124. The step structure 123 is connected to the first frame body 121 and the third frame body 124, and the third frame body 124 is disposed on a side, facing towards the backlight module 13, of the first frame body 121, and is opposite to the opening in the first frame body 121. The third frame body 124 of the middle frame 12 can prevent light from leaking from the opening in the first frame body 121 and improve a bearing capability of the middle frame 12, such that the middle frame is reinforced. In addition, the middle frame 12 is provided with an avoidance structure, and the control circuit 15 bypasses the middle frame 12 through the avoidance structure to connect to the display panel 14. The backlight module 13 includes a light emitting assembly disposed on a second side of the middle frame 12. The third frame body 124 is disposed on sides other than the second side. As the light emitting assembly is disposed on the second side, the first frame body 121 is proximal to the back face of the light emitting assembly, and a possibility of light leak is less. Therefore, the third frame body is not disposed. In some embodiments, the second side of the middle frame 12 is the lower side of the display module. In the case that the light emitting assembly is disposed on the second side of the middle frame 12, that is, the light emitting assembly is disposed on the lower side of the display module, a light efficiency of the light guide plate is not affected by a great distance from the light emitting assembly due to moving in the case that the display module is vertically disposed. In some embodiments, the second side and the first side in the above embodiments are the same side or different sides (for example, opposite sides), such that a higher local temperature caused by centralized heat of the light emitting assembly on the second side and the control circuit on the first side is avoided. In some embodiments, the second side is opposite to the first side in the above embodiments.

Referring to FIG. 10, a gap q is defined in the first frame body 121 of the middle frame 12. The gap q is opposite to the opening k in the frame 17 shown in FIG. 9, such that a screw passing the opening k is connected to a screw on a sidewall of the backplane through the gap q. Illustratively, a section shown in FIG. 6 is disposed in the gap q (the section passes the gap q, and is perpendicular to a display face of the display panel), and thus the first frame body is not shown.

Figure 14:
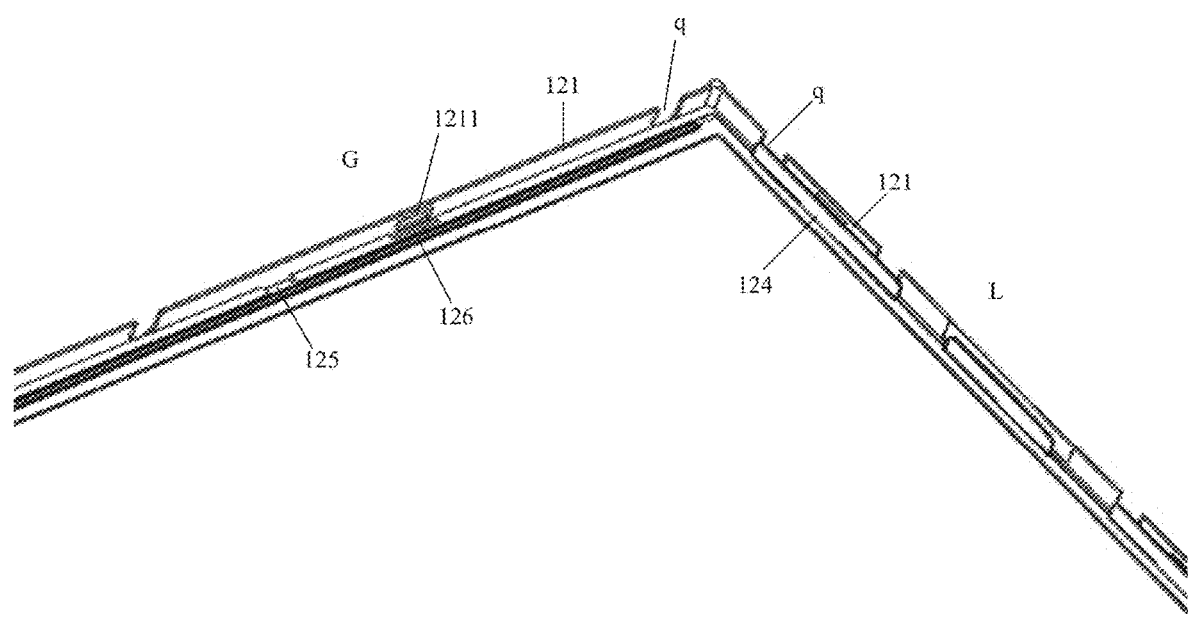
FIG. 14 is a schematic structural diagram of the middle frame shown in FIG. 10 viewed from a side proximal to the backplane.
Figure 15:
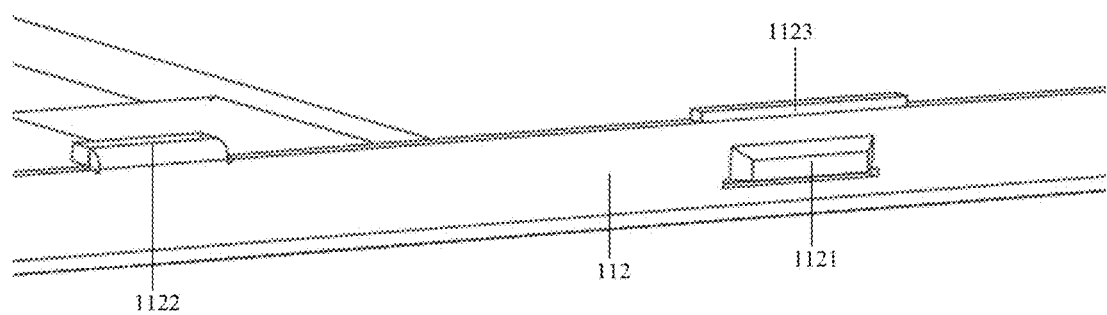
FIG. 15 is a schematic structural diagram of a side wall of a backplane according to some embodiments of the present disclosure.

Referring to FIG. 14 and FIG. 15, FIG. 14 is a schematic structural diagram of the middle frame shown in FIG. 10 viewed from a side proximal to the backplane, and FIG. 15 is a schematic structural diagram of a side wall of a backplane according to some embodiments of the present disclosure. The lower side G and the right side L are shown in FIG. 14, and structures of the upper side and the left side are referred to the right side L. The lower side G is in a single-layer frame body structure, that is, the lower side G is only provided with the first frame body 121. On the right side L, the middle frame is further provided with the third frame body 124, and the third frame body 124 is provided in the first frame body 121. It can be seen that the middle frame is in a single layer structure at the gap q of the third frame body 124, and the middle frame is in a double layer structure at other positions of the right side L. The double layer structure can avoid the light leak at the opening (that is, the opening shown in FIG. 13 for fixing the protrusion structure 1121) of the first frame body 121, and improve the stability of the whole structure. The protrusion structure 1121, a positioning protrusion 1122, and a protruding structure 1123 on the sidewall 112 of the backplane are shown in FIG. 15. The protruding structure 1123 is disposed on the sidewall 112 of a position of the protruding structure 1123, such that an area around the protrusion structure 1121 is increased, and the side wall 112 is prevented from splitting in forming the protrusion structure 1121 (for example, forming the protrusion structure 1121 by stamping). As shown in FIG. 14, a first middle frame groove 125 and a second middle frame groove 126 is provided on the middle frame 14, and the two grooves are disposed on a side, facing towards the backplane, of the middle frame. The first middle frame groove 125 is configured to avoid the positioning protrusion 1122 shown in FIG. 15, and the second middle frame groove 126 is configured to avoid the protruding structure 1123 shown in FIG. 15, such that the middle frame 12 is greatly affixed to the backplane 11.

The lower side is set as a single layer structure to reserve an enough space for the light emitting assembly on the lower side. In the case that the light emitting assembly is disposed on other sides, the middle frame on the side of the light emitting assembly is set as a single layer structure, which is not limited in the embodiments of the present disclosure.

Figure 16:
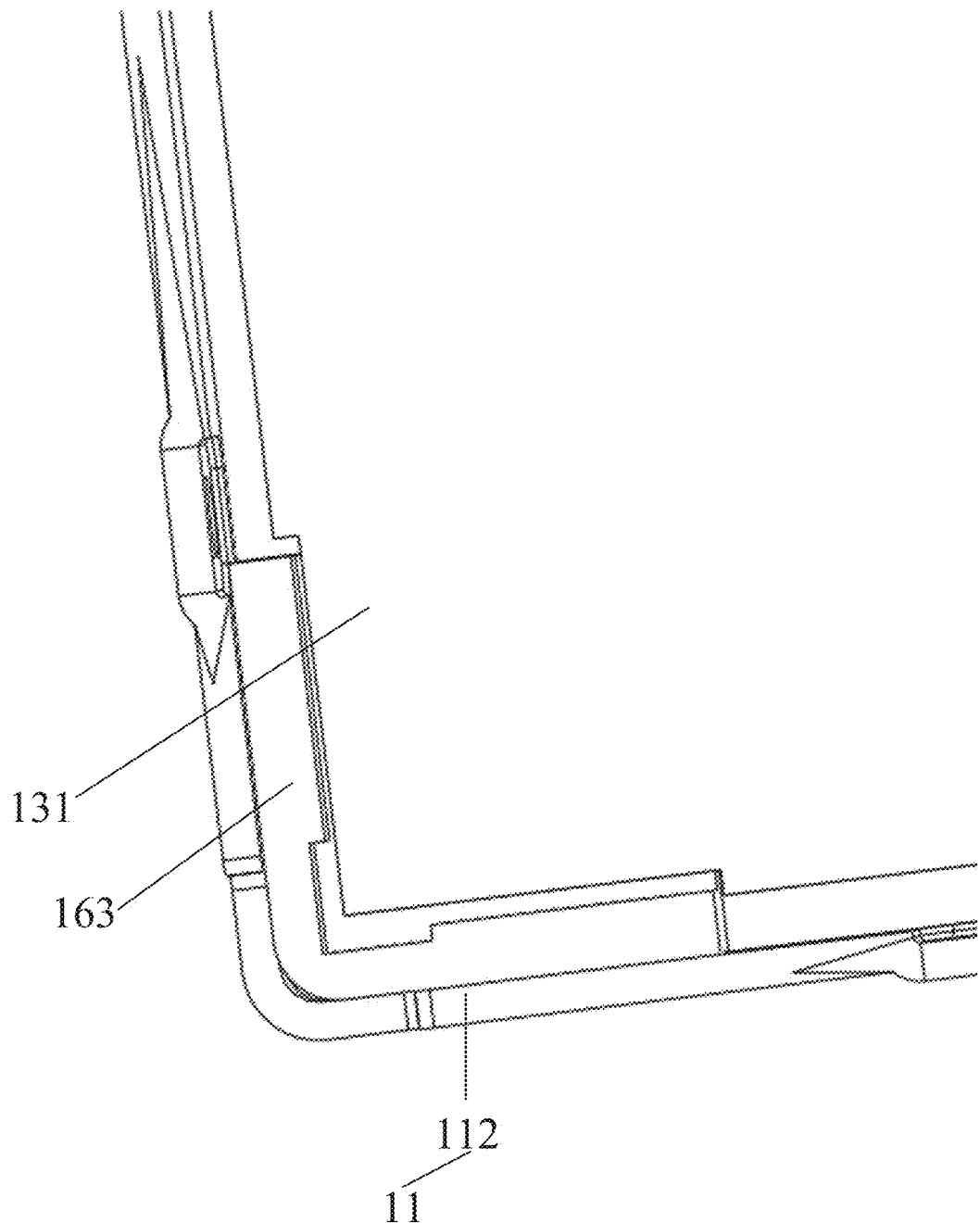
FIG. 16 is a schematic diagram of a position of a buffer structure of a light guide plate in a region S in the display module shown in FIG. 1.

As shown in FIG. 16, FIG. 16 is a schematic diagram of a position of a buffer structure of a light guide plate in a region S in the display module shown in FIG. 1. An orthogonal projection of the light guide plate 131 on a plate body 111 is in a rectangular shape. That is, the light guide plate 131 is in a rectangular shape, and is enclosed by two larger faces and side faces. The two larger faces are a light emitting face and a back face, and a front face of the light guide plate is shown in the drawing. In some embodiments, a thickness of the light guide plate 131 is 0.2 mm, and the light guide plate guides the emitted light from the light emitting face to the display panel 14, such that the light is more uniform.

The backplane 11 includes a plate body 111 and a side wall 112 extending from an edge of the plate body, and the buffer structure 16 further includes at least one L-shaped buffer structure 163. The L-shaped buffer structure 163 is disposed on the plate body 111 of the backplane 11, and is disposed between at least one corner of the backlight module 13 and the side wall 112 of the backplane 11. The L-shaped buffer structure 163 protects at least one corner of the light guide plate 131 from damage, and reduces the vibration amplitude of the light guide plate 131 in using the display device.

In some embodiments, a number of the L-shaped buffer structures is four. The L-shaped buffer structure is disposed on four corners of the backlight module 13, such that the corners of the light guide plate is not damaged, and the seismic property of the display device is further improved.

Figure 17:
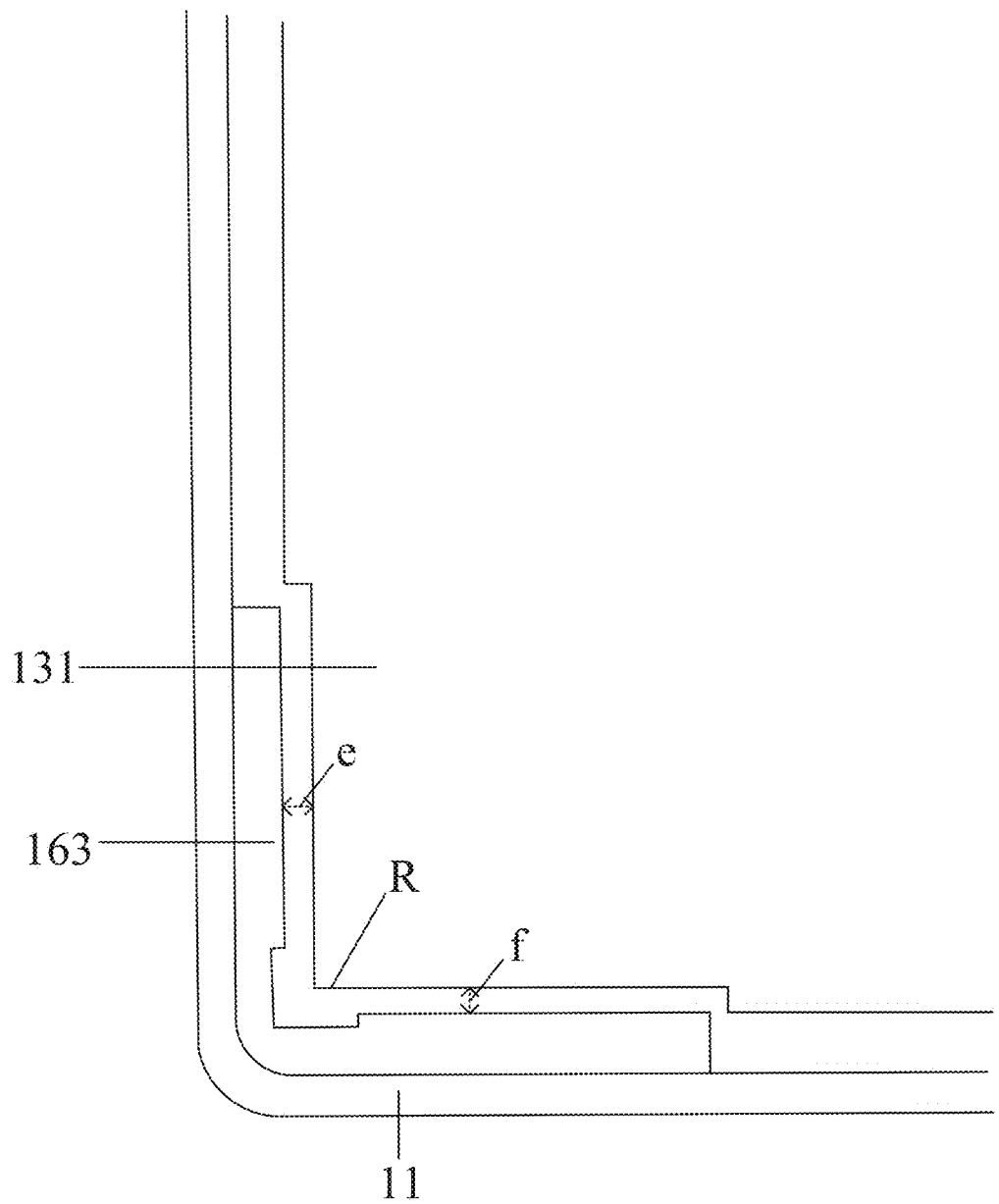
FIG. 17 is a schematic planar diagram of a reflecting sheet, an L-shaped buffer structure, and a backplane in a region S in the display module shown in FIG. 1.

In some embodiments, the backlight module 13 further includes a reflecting sheet on a face, distal from the display panel, of the light guide plate. As shown in FIG. 17, FIG. 17 is a schematic planar diagram of a reflecting sheet, an L-shaped buffer structure, and a backplane in a region S in the display module shown in FIG. 1. An abdication structure R matching the L-shaped buffer structure 163 is disposed on at least one corner of the reflecting sheet 132. The abdication structure R is retracted towards relative to the L-shaped buffer structure 163, the reflecting sheet 132 matches the L-shaped buffer structure 163 through the abdication structure R, and the reflecting sheet 132 is affixed through the L-shaped buffer structure 163.

The display module is rectangular. In FIG. 17, a horizontal direction is a direction of a long side of the display module, and a vertical direction is a direction of a short side of the display module. In the horizontal direction, a distance e between the abdication structure R and the L-shaped buffer structure 163 ranges from 0.4 mm to 0.8 mm, for example, 0.6 mm. In the vertical direction, a distance f between the abdication structure R and the L-shaped buffer structure 163 ranges from 0.15 mm to 0.25 mm, for example, 0.2 mm. By disposing the distance between the abdication structure R and the L-shaped buffer structure 163, a space is reserved for tolerances of the reflecting sheet 132 and the L-shaped buffer structure 163 to avoid of a failure of disposing, and the L-shaped buffer structure 163 is prevented from being squeezed due to thermal expansion of the reflecting sheet 132 in the increment of the ambient temperature. It can be seen that as a size in the direction of the long side of the display module is greater than a size in the direction of the short side of the display module, an increased size in the direction of the long side is greater than an increased size in the direction of the short side in the thermal expansion of the reflecting sheet 132, and the distance e is greater than the distance f.

Referring to FIG. 5, the display device further includes a frame 17. The frame 17 includes an outer frame 171 and a second frame body 172. The outer frame 171 surrounds the middle frame 12 and the backplane 11, and the second frame body 172 extends from an edge of the outer frame 171 to the center of the backlight module 13 (the second frame body 172 extending from an edge of the outer frame 171 to the center of the backlight module 13 indicates an extension direction of the second frame body 172 is parallel to a display face of the display panel and faces inwards the display panel). The display panel 14 and the backlight module 13 are disposed on a same side of the second frame body 172, and the buffer structure 16 further includes a third buffer structure 164 on a face, proximal to the display panel 14, of the second frame body 172. A side, proximal to the display panel 14, of the second frame body 172 of the frame 17 is attached with the third buffer structure 164 to ensure the strength of the display module, and the light leak of the display panel 14, deformation, and other negative effects are efficiently avoided.

In some embodiments, as shown in FIG. 5, the middle frame 12 further includes a step structure 123 on a side distal from the bearing structure 122. The step structure 123 is connected to the bearing structure 122, and a side, distal from the backplane 11, of the step structure 123 is in contact with the second frame body 172, and is configured to form the second frame body 172. A gap is present between a side, distal from the display panel 14, of the step structure 123 and the outer frame 171 to avoid collision with the outer frame 171. The gap ranges from 0.1 mm to 0.2 mm.

In some embodiments, as shown in FIG. 5, in a direction perpendicular to a display face M1 of the display panel 14, a distance between the second frame body 172 and the display panel 14 ranges from 0.1 mm to 1 mm. That is, a maximum distance is 1 mm, and a minimum distance is 0.1 mm. By setting a less distance between the second frame body 172 and the display panel 14, the second frame body is prevented from directly pressing on the display face M1 to affect the display face M1, and the light leak between the second frame body and the display face is avoided.

In some embodiments, the frame 17 is an electroplated zinc steel plate. A thickness of the electroplated zinc steel plate ranges from 0.6 mm to 0.8 mm, for example, 0.8 mm. Widths of the edges of the electroplated zinc steel plate range from 9.4 mm to 10.4 mm. In addition, a black spray paint treatment is performed on the electroplated zinc steel plate, such that the frame 17 is directly used as an appearance member to beautify the display module.

As shown in FIG. 6, the backplane 11 includes a plate body 111 and a side wall 112 extending from an edge of the plate body 111, and the display device 10 further includes a fixing screw 18. The fixing screw 18 passes through the second frame body 172 and the side wall 112 of the backplane 11 to fix the second frame body 172 and the side wall 112. The fixing screw 18 efficiently fixes the backplane 11 and the frame 17, and the backplane 11 and the middle frame 12 are fixed together by the protrusion structure on the side wall 112, such that the two structures closely fix the back plate 11, the middle frame 12, and the frame 17, and the stability of the structure of the display module is ensured.

It should be noted that the fixing screw 18 shown in FIG. 6 and the protrusion structure 1121 on the side wall 112 of the backplane shown in FIG. 12 are spaced apart to avoid each other. The fixing screw is disposed on the position of A-A shown in FIG. 1, and the protrusion structure is disposed on the position of B-B shown in FIG. 1.

Figure 18:
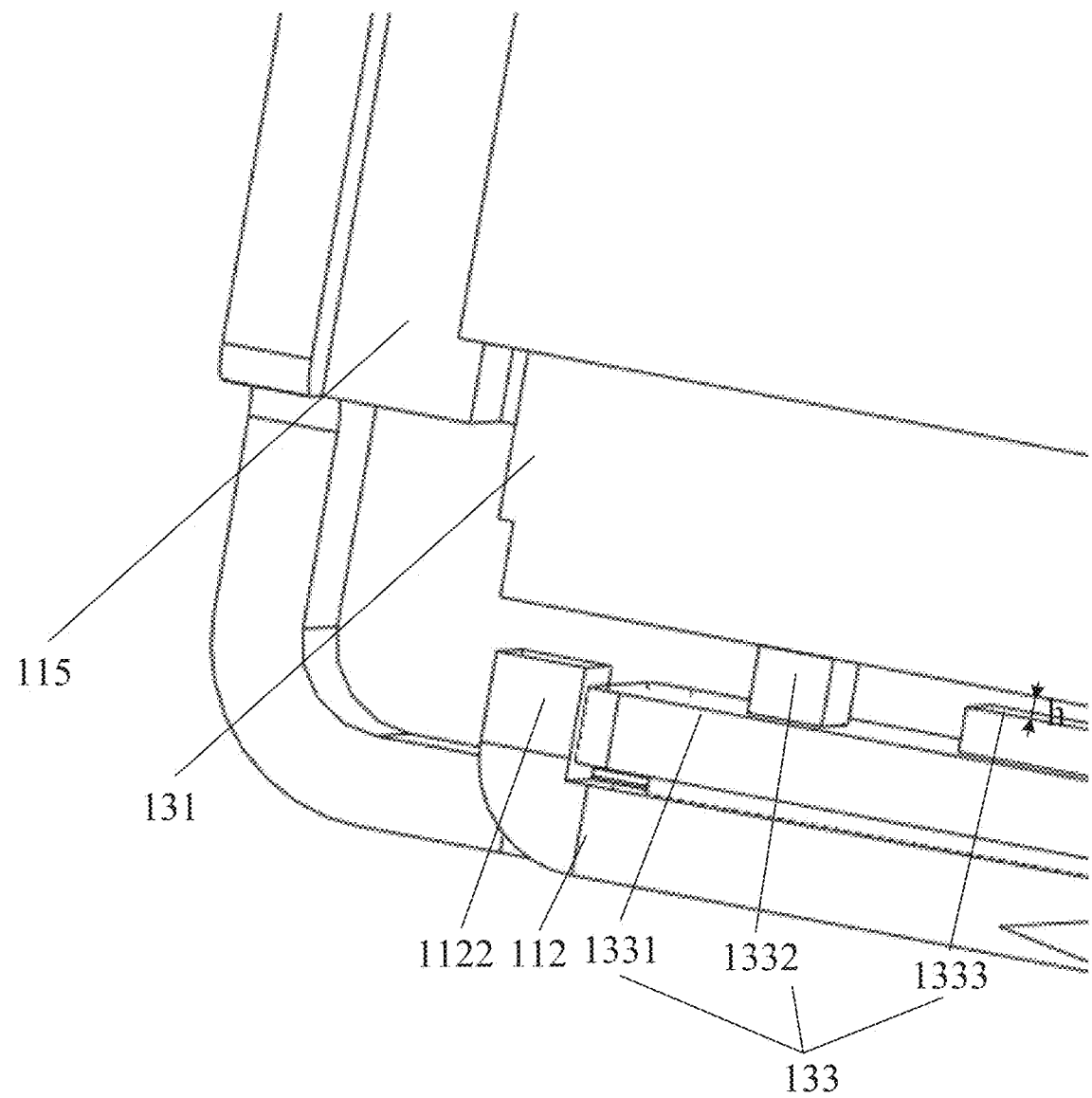
FIG. 18 is a schematic structural diagram of a light emitting assembly in a region S in the display module shown in FIG. 1.
Figure 19:
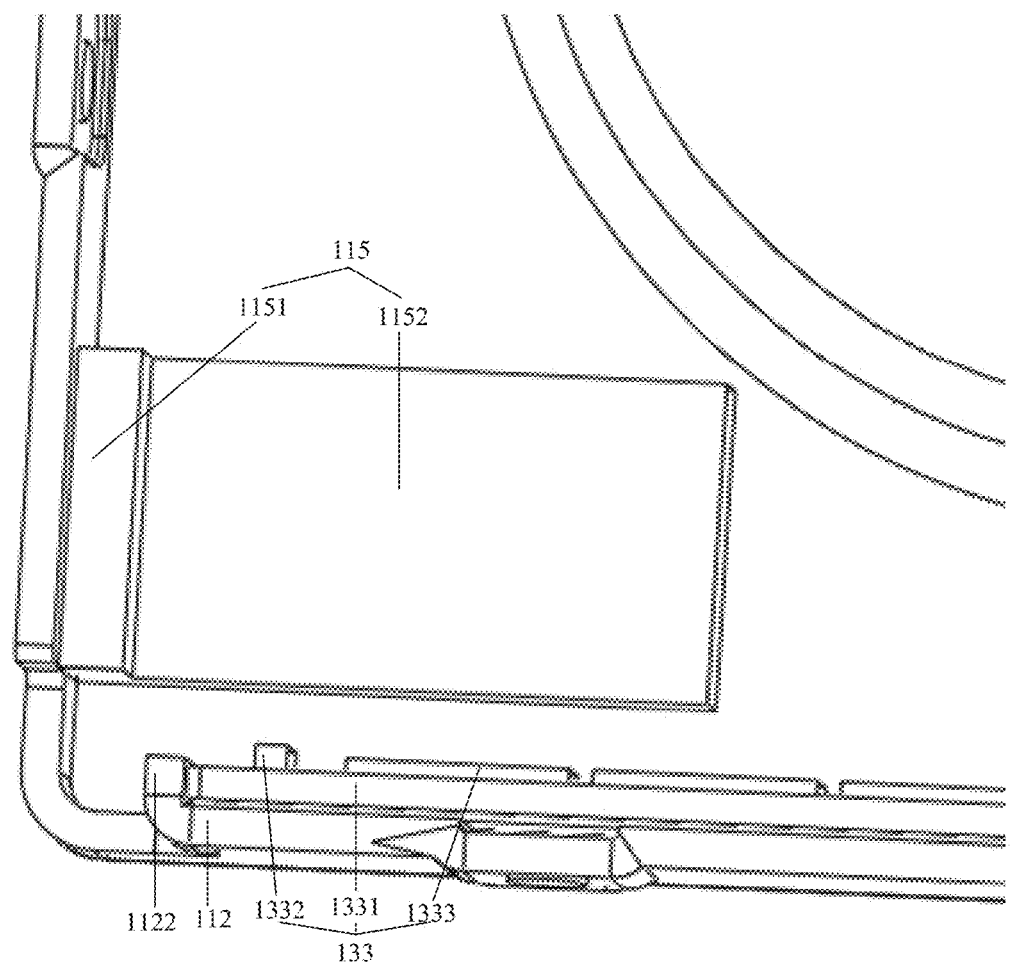
FIG. 19 is a schematic structural diagram of a region S in the display module shown in FIG. 1.
Figure 20:
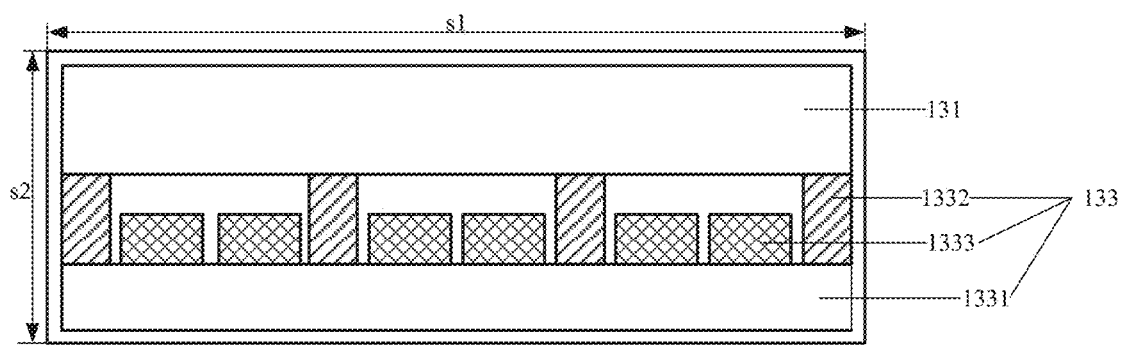
FIG. 20 is a front view of a light emitting assembly in the display module shown in FIG. 1.

Referring to FIG. 18, FIG. 19, and FIG. 20, FIG. 18 is a schematic structural diagram of a light emitting assembly in a region S in the display module shown in FIG. 1, FIG. 19 is a schematic structural diagram of a region S in the display module shown in FIG. 1 (the light guide plate is not shown in FIG. 19 for clear illustration of the structure), and FIG. 20 is a front view of a light emitting assembly in the display module shown in FIG. 1. The backlight module further includes a light emitting assembly 133 disposed on a side face of the light guide plate 131. The light emitting assembly 133 is not overlapped with an orthogonal projection of the light guide plate 131 on a plane of the light exiting face of the light guide plate 131.

The light emitting assembly 133 includes a strip-shaped light emitting chip bearing substrate 1331, a stop block 1332, and a plurality of light emitting chips 1333 on the light emitting chip bearing substrate 1331. One side of the stop block 1332 is in contact with the light emitting chip bearing substrate 1331, the other side of the stop block 1332 is in contact with the side face of the light guide plate 131, and a size of the stop block 1332 is greater than a size of the light emitting chip 1333 in a direction perpendicular to the side face of the light guide plate 131. Two opposite sides of the stop block 1332 are respectively in contact with the light emitting chip bearing substrate 1331 and the light guide plate 131, and the size of the stop block 1332 is greater than the size of the light emitting chip 1333, such that a position is reserved for the light emitting chip 1333 to cause the light emitting chip 1333 to be not in contact with the light guide plate 131. A distance h between the light emitting chip 1333 and the side face of the light guide plate 131 ranges from 0.25 mm to 0.3 mm. In shaking the display module, the light emitting chip bearing substrate 1331 compresses the stop block 1332, such that the distance between the light emitting chip 1333 and the light guide plate 131 is reduced. By reserving the distance h between the light emitting chip 1333 and the side face of the light guide plate 131, the damage on the light guide plate 131 and the light emitting chip 1333 due to the collision between the light emitting chip 1333 and the light guide plate 131 is avoided. In some embodiments, the distance h between the light emitting chip 1333 and the side face of the light guide plate 131 is 0.25 mm. With such distance, the distance between the light emitting chip 1333 and the side face of the light guide plate 131 is not great, and an effect on the luminance efficiency is less.

A light guide plate stop structure 115 is disposed on a position, proximal to the light guide plate 131, of the backplane 11, and the light guide plate stop structure 115 is in a stepped structure and is provided with a stop step 1151 and a bearing face 1152. The light guide plate 131 is disposed on the bearing face 1152 of the light guide plate stop structure 115, and the stop step 1151 limits the position of the light guide plate 131, such that a greater shift of the light guide plate 131 is avoided, and the fixation of the light guide plate 131 is supported.

Figure 21:
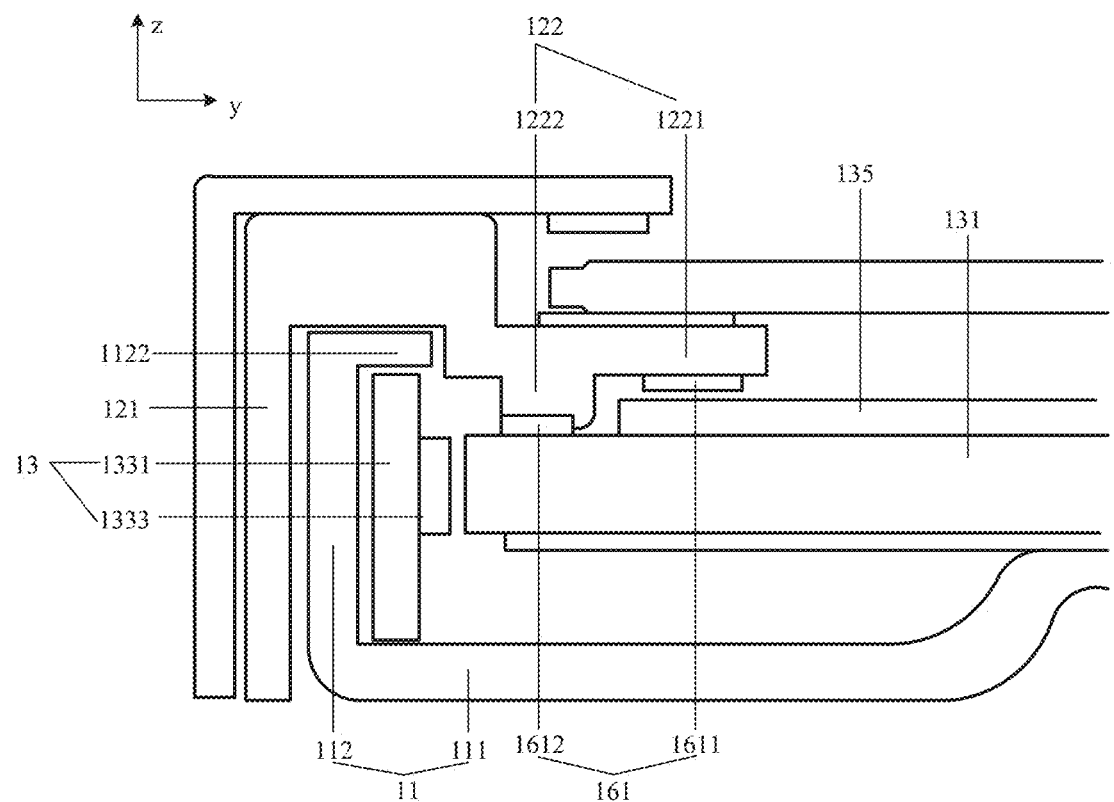
FIG. 21 is a section diagram at a position of D-D in FIG. 1.
Figure 22:
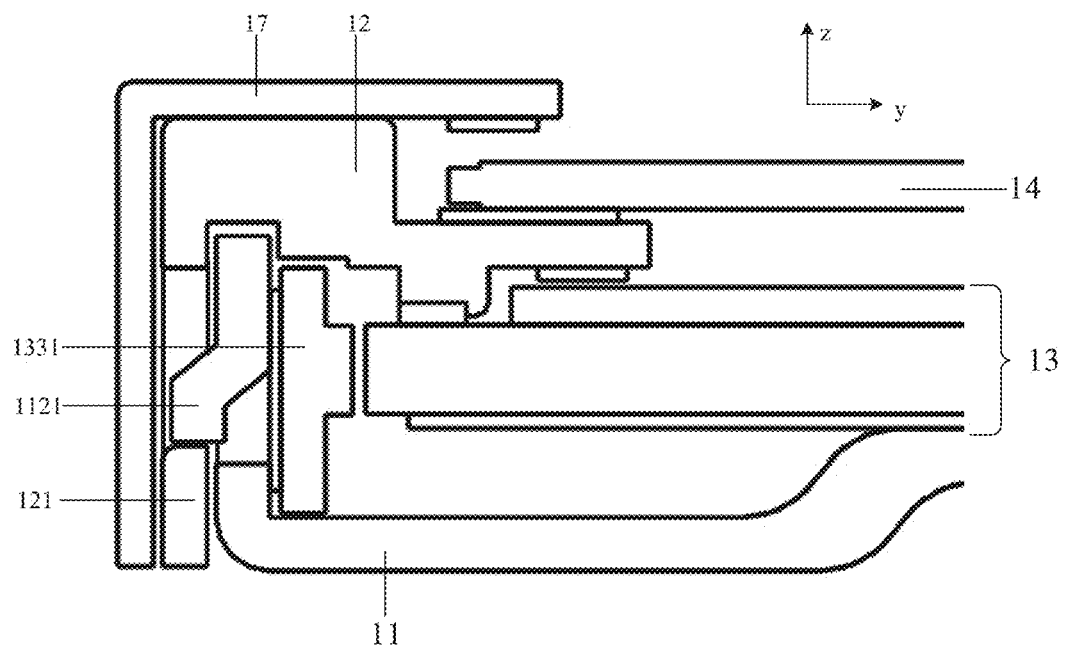
FIG. 22 is a section diagram at a position of W-W in FIG. 1.
Figure 23:
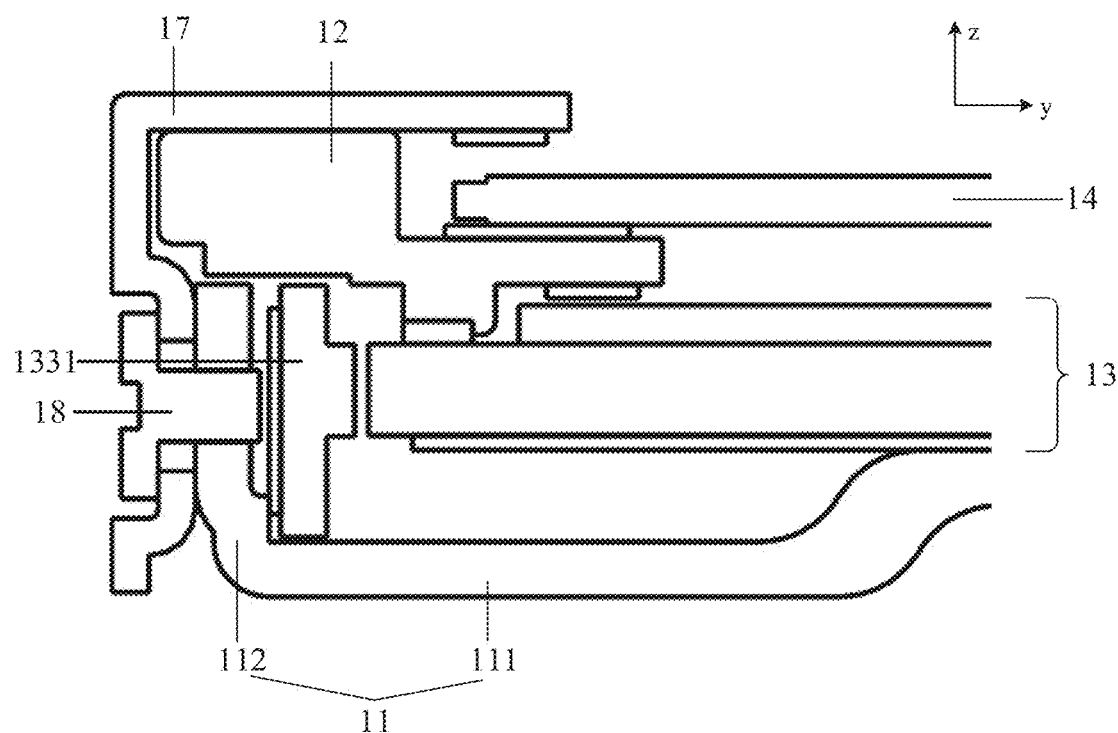
FIG. 23 is a section diagram at a position of V-V in FIG. 1.

In some embodiments, as shown in FIG. 21, FIG. 21 is a section diagram at a position of D-D in FIG. 1. As shown in FIG. 22, FIG. 22 is a section diagram at a position of W-W in FIG. 1. As shown in FIG. 23, FIG. 23 is a section diagram at a position of V-V in FIG. 1. FIG. 22 shows a structure of the display module at a position at which the backplane is connected to middle frame through the protrusion structure on a side including the light emitting assembly 133, and FIG. 23 shows a structure of the display module at a position at which the backplane is connected to middle frame through the fixing screw on a side including the light emitting assembly 133. The backplane 11 includes a plate body 111 and a side wall 112 extending from an edge of the plate body 111, and the light emitting chip bearing substrate 1331 is disposed on the side wall 112. In some embodiments, an edge, distal from the plate body 111, of the side wall is provided with the positioning protrusion 1122 extending in the direction of the light guide plate 131 (extending in the direction of the light guide plate 131 indicates that an extension direction of the positioning protrusion is parallel to a plate face of the light guide plate 131 and faces inwards the light guide plate 131), and the light emitting chip bearing substrate 1331 is disposed between the positioning protrusion 1122 and the plate body 111. Thus, the positioning protrusion 1122 fixes the light emitting chip bearing substrate 1331 and limits the light emitting chip bearing substrate 1331.

FIG. 21, FIG. 22, and FIG. 23 show schematic structural diagrams of a side of the display module with the light emitting assembly at different positions. It can be seen that compared with the side of the display module without light emitting assembly (for example, structures shown in FIG. 5 and FIG. 6), the side with the light emitting assembly is not provided with the third frame body. As the side with the light emitting assembly, the opening in the first frame body 121 is proximal to the back face of the light emitting assembly, and the light leak does not occur. Therefore, the third frame body is not disposed. In some embodiments, the side with the light emitting assembly is provided with the third frame body, which is not limited in the embodiments of the present disclosure.

In addition, FIG. 22 is a schematic structural diagram of a position of fixing the backplane 11 and the middle frame 12 through the protrusion structure 1121, FIG. 23 is a schematic structural diagram of position of fixing the outer frame 17 and the backplane 11 through the fixing screw 18. The two structures are spaced apart on the side with the light emitting assembly. FIG. 21 is a schematic structural diagram of a side with the light emitting assembly, that is, without the protrusion structure and the fixing screw. The section position D-D in FIG. 21 is located between the section position W-W in FIG. 22 and the section position V-V in FIG. 23.

It should be noted that on any side of the display module without the light emitting assembly, the protrusion structure and the fixing screw are spaced apart to fix the backplane and the middle frame, and to fix the outer frame and the backplane. Structures of other sides are referred to as FIG. 5 and FIG. 6, which are not limited in the embodiments of the present disclosure.

Referring to FIG. 21, the backlight module 13 further includes a film material 135. The film material 135 is disposed on the light exiting face of the light guide plate 131, an orthogonal projection of the film material 135 on a plane of the light guide plate 131 is within the light guide plate 131, and at least one side of the light guide plate 131 includes an edge region not covered by the film material 135. In some embodiments, a light emitting side (that is, a side with the light emitting assembly) of the light guide plate 131 includes the edge region covered by the film material 135.

An attaching region 1221 and a bearing boss 1222 are disposed on a face, facing towards the backlight module 13, of the bearing structure 122, and the first buffer structure 161 includes a first buffer sub-structure 1611 on the attaching region 1221 and a second buffer sub-structure 1612 on the bearing boss 1222. The first buffer sub-structure 1611 is adjacent to the film material 135, and the second buffer sub-structure 1612 is in contact with the edge region of the light guide plate 131. The first buffer sub-structure 1611 is adjacent to the film material 135, such that the film material is not damaged in shaking. The second buffer sub-structure 1612 is in contact with the edge region of the light guide plate 131, such that the shaking of the light guide plate 131 is reduced, and the light leak is avoided due to direct contact of the second buffer sub-structure 1612 and the edge region of the light guide plate 131. For example, the second buffer sub-structure 1612 is made from a black buffer material to further avoid the light leak.

FIG. 21 shows a section of a side (for example, the lower side), with the light emitting assembly, of the display module.

In some embodiments, an orthogonal projection of the light guide plate 131 on the plate body 111 is in a rectangular shape, and the light emitting assembly 133 is disposed on the side face of the long side of the light guide plate 131.

In some embodiments, the light emitting assembly 133 includes two light bars, and the two light bars are disposed on the same side of the light guide plate 131. In such structure, each light bar is short, and the manufacturing difficulty is reduced. Each light bar is provided with a plurality of (for example, 77) light emitting chips. In some embodiments, an encapsulated length of each light emitting chip is 7 mm, a width is 2 mm, a current passing each light emitting chip is about 85 mA, a power consumption of the whole light emitting chip is about 93 W, a lifetime of the light bar is 50 thousand hours. The light emitting assembly 133 causes that an average luminance of the display module up to 1000 nit in displaying white screens. The light emitting assembly of such structure causes the luminance and uniformity of the display screen of the display module to be great (for example, the uniformity is 75%) and the display screen color gamut to be wide (for example, 72%). In some embodiments, the light emitting assembly 133 includes one light bar, which is not limited in the embodiments of the present disclosure.

It can be seen from FIG. 20 that the light emitting assembly 133 is disposed on an outer side of a long side of the light guide plate 131, that is, the light emitting assembly 133 is a single side long side light emitting.

Figure 24:
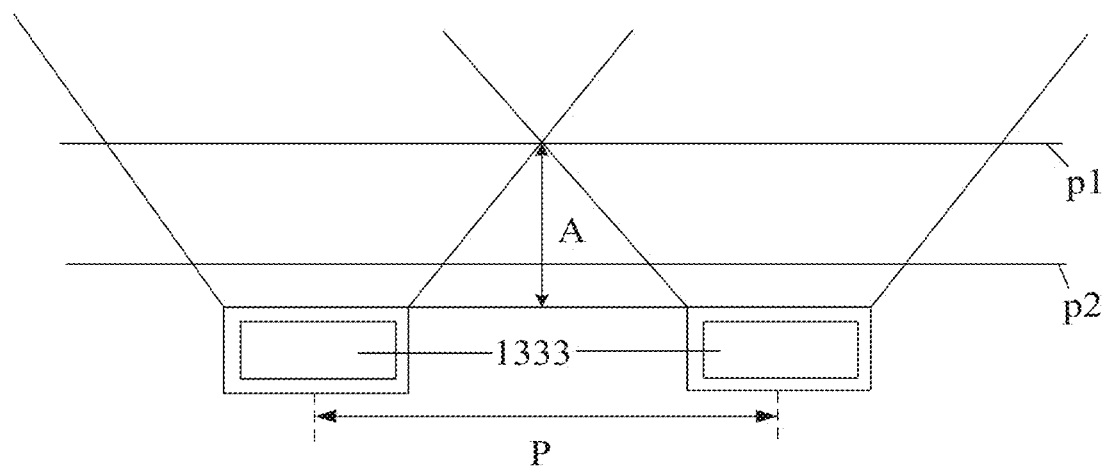
FIG. 24 is a schematic diagram of a relationship of a distance between a display panel and a light emitting chip according to some embodiments of the present disclosure.

As shown in FIG. 24, FIG. 24 is a schematic diagram of a relationship of a distance between a display panel and a light emitting chip according to some embodiments of the present disclosure. In the drawing, p1 represents an edge of the display region of the display panel 14, p2 represents an edge of the light guide plate 131, A represents a distance between the display panel 14 and the light emitting chip 1333, and P represents a distance between centers of any two lights in the light emitting chip 1333. For avoidance of the phenomenon of uneven light and dark in the display screen due to a light column bright area in the region of the light guide plate proximal to the light source caused by the limited divergence angle of light source, a value of A/P in the drawing is greater than 0.75, for example, 0.92.

Figure 25:
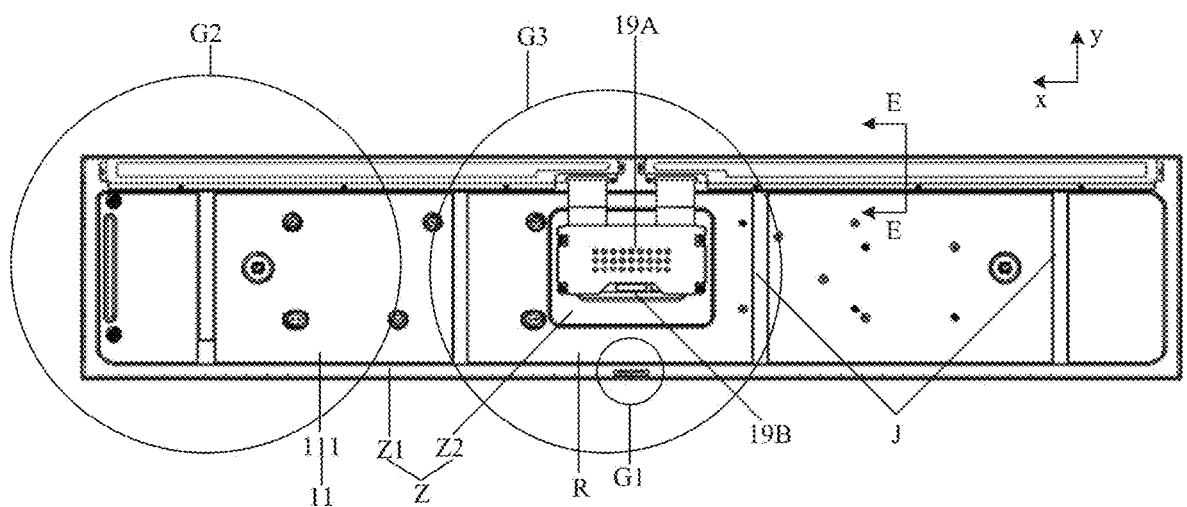
FIG. 25 is a schematic diagram of a back face of a display module according to some embodiments of the present disclosure.
Figure 26:
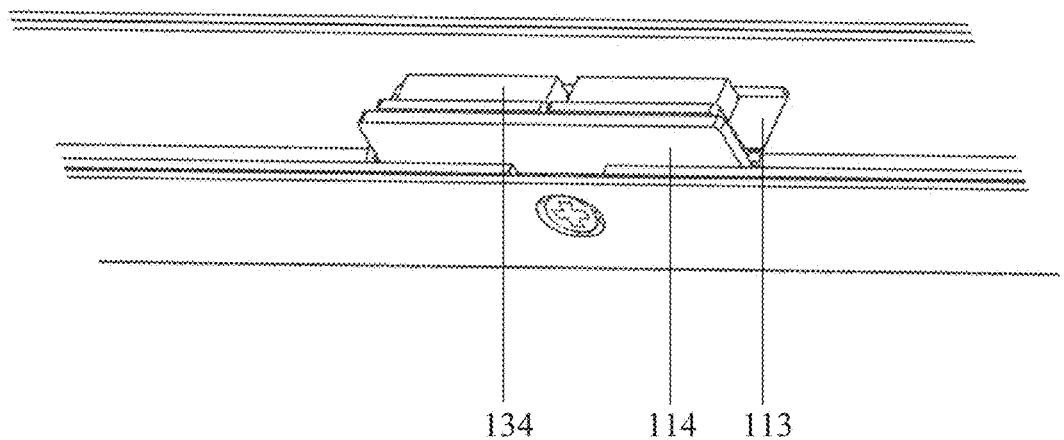
FIG. 26 is a locally schematic structural diagram of an edge of a region G1 in the display module shown in FIG. 25.

In some embodiments, as shown in FIG. 25, FIG. 25 is a schematic diagram of a back face of a display module according to some embodiments of the present disclosure. As shown in FIG. 26, FIG. 26 is a locally schematic structural diagram of an edge of a region G1 in the display module shown in FIG. 25. A terminal opening 113 and a terminal stopping wall 114 extending from an edge of the terminal opening 113 are disposed in and on the backplane. The terminal stopping wall 114 is disposed on a side, distal from the display panel 14, of the backplane 11. The backlight module 13 further includes a backlight connection terminal 134. The backlight connection terminal 134 is electrically connected to the light emitting chip bearing substrate 1331, and the backplane 11 protrudes from the terminal opening 113.

In some embodiments, in a direction away from the display panel 14, a height of the backlight connection terminal 134 is less than a height of the terminal stopping wall 114. The height of the terminal stopping wall 114 on the backplane is greater than a height of the backlight connection terminal 134 in the backlight module, such that the terminal stopping wall 114 efficiently protects the backlight connection terminal 134. Therefore, the backlight connection terminal 134 is greatly connected to the light emitting chip bearing substrate 1331, and the backlight connection terminal 134 is not prone to damage.

Figure 27:
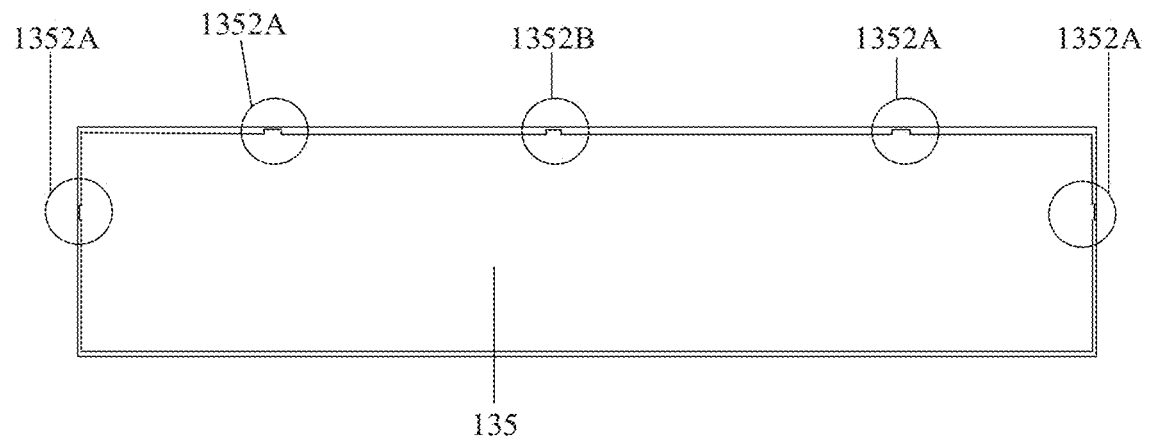
FIG. 27 is a schematic structural diagram of a film material in the display module shown in FIG. 1.
Figure 28:
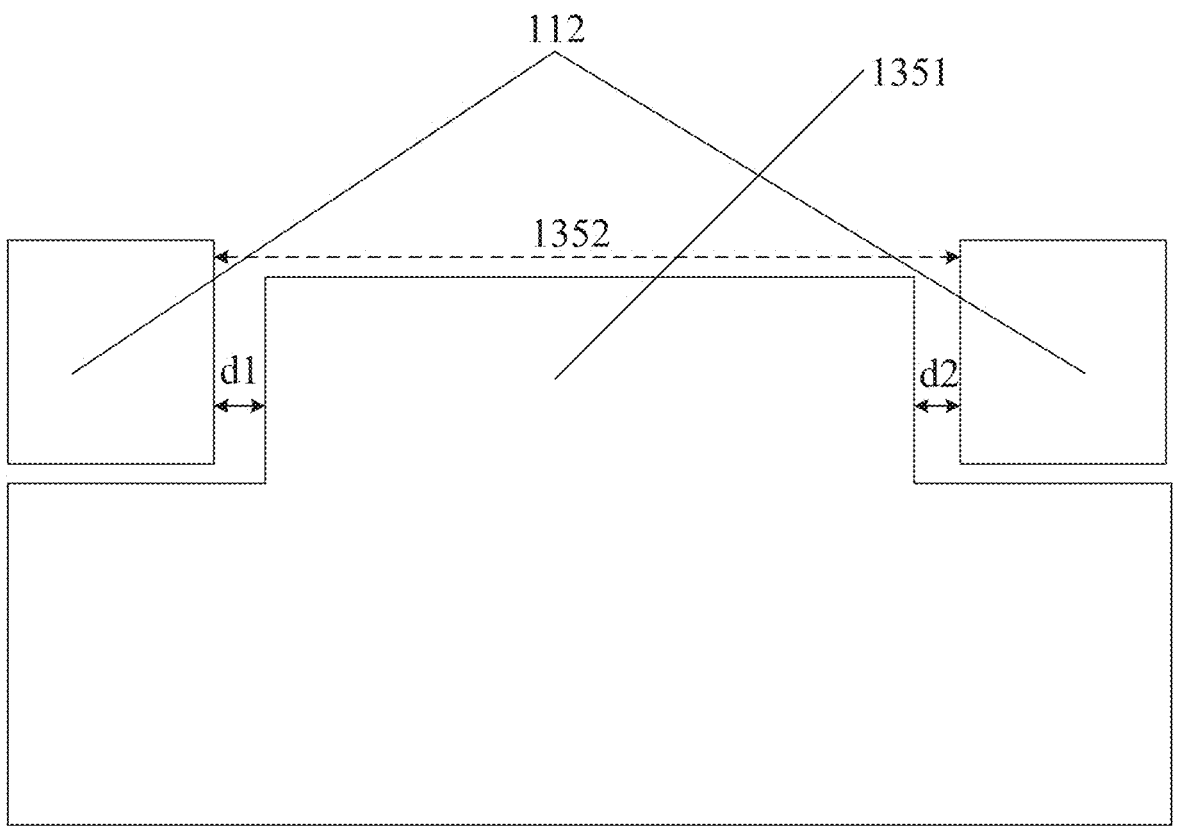
FIG. 28 is a schematic structural diagram of a film material at a position of 1351B shown in FIG. 27.

As shown in FIG. 27, FIG. 27 is a schematic structural diagram of a film material in the display module shown in FIG. 1. As shown in FIG. 28, FIG. 28 is a schematic structural diagram of a film material at a position of 1351B shown in FIG. 25. The backlight module 13 further includes a film material 135 disposed on a side of the light exiting face of the light guide plate 131.

At least one stop protrusion 1351 is disposed at an edge of the film material 135, the backplane 11 includes at least one stop opening 1352 in one to one correspondence to the at least one stop protrusion 1351. The stop protrusion 1351 is disposed in the stop opening 1352. The stop opening 1352 is disposed in the side wall 112 of the backplane 11.

In some embodiments, at least two types of the stop openings 1352 are defined, the at least two types of the stop openings 1352 include a first stop opening and a second stop opening. In an extension direction of the edge of the film material 135, a length difference between the first stop opening and the corresponding stop protrusion 1351 is greater than a length difference between the second stop opening and the corresponding stop protrusion 1351. With such structure, the first stop opening roughly positions the stop protrusion of the film material 135, and the second stop opening finely positions the stop protrusion of the film material 135. The first stop opening is cooperated with the second stop opening, such that a case where the film material is rolled and cannot be disposed due to only the fine positioning and no reserve of error space and film material expansion amount is avoided, and a case of shift of the display screen due to not accurate disposing position of the film material caused by only rough positioning is avoided.

The above embodiments are solutions of coincided sizes of the stop protrusions and not coincided sizes of the stop openings. However, in some embodiments, the sizes of the stop openings are coincided, the sizes of the stop protrusions are not coincided, and the fine positioning and the rough positioning are achieved by the stop protrusions with different sizes. In some embodiments, the sizes of the stop openings are not coincided, and the sizes of the stop protrusions are not coincided, which are not limited in the embodiments of the present disclosure.

As shown in FIG. 28, in the case that the stop opening 1352 is a second stop opening, a length difference d1+d2 between the second stop opening 1352B and the corresponding stop protrusion 1351 ranges from 0.1 mm to 0.3 mm, for example, 0.2 mm. Both the d1 and d2 range from 0.05 mm to 0.15 mm, for example, 0.1 mm. In the case that the stop opening 1352 is a first stop opening, a length difference d1+d2 between the first stop openings 1352A and the corresponding stop protrusion 1351 ranges from 1 mm to 3 mm, for example, 2 mm. Both the d1 and d2 range from 0.5 mm to 1.5 mm, for example, 1 mm.

In some embodiments, the film material 135 is in a rectangular shape, and the first stop openings 1352A are disposed in different edges of the rectangle to increase the accuracy of positioning. In some embodiments, one second stop opening 1352B and two first stop openings 1352A on two sides of the second stop opening 1352B are disposed on the long side of the film material 135, and one first stop opening 1352A is disposed on each of two short sides of the film material. The second stop protrusion 1351B matches the second stop opening 1352B to finely position the film material 135, and one second stop opening is disposed to achieve the effect. In addition, by disposing the first stop opening 1352A in three sides of the film material 135, the positioning of the film material is achieved on three sides, and the positioning effect is great. In addition, one first stop opening 1352A is disposed on both sides of the second stop opening 1352B, such that the fine positioned second stop opening 1352B is protected, and the second stop protrusion 1352A is prevented from damage in shaking the film material 135. It should be noted that, on the side of the backplane with the light emitting assembly, the stop opening is not disposed in some embodiments, and the corresponding film material is not disposed with the stop protrusion on the side, such that the light leak at the stop opening is avoided.

Figure 29:
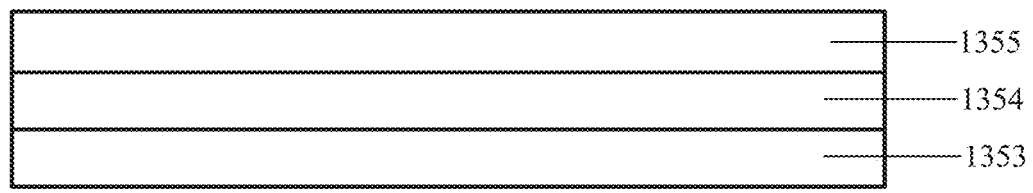
FIG. 29 is a schematic diagram of a film material of a display module according to some embodiments of the present disclosure.

As shown in FIG. 29, FIG. 29 is a schematic diagram of a film material of a display module according to some embodiments of the present disclosure. The backlight module 13 further includes the film material 135 disposed on the light emitting face of the light guide plate 131, and the film material 135 includes a first prism 1353, a second prism 1354, and a diffusion plate 1355 that are sequentially laminated in the direction away from the light guide plate 131. The first prism 1353 and the second prism 1354 are disposed in the backlight module, such that the light is constantly reused under the action of the prism to improve the display luminance of the display panel 14. The diffusion plate 1355 is disposed on the side, distal from light guide plate 131, of film material 135, such that the light is scattered, and a uniform face light source is provided for the display panel 14.

In some embodiments, the backplane 11 is made from aluminum with a thickness of 1.2 mm. The backplane 11 is made from pure aluminum, such that the strength of the backplane 11 is ensured, and the heat dispersion property of the backplane 11 is ensured.

Figure 30:
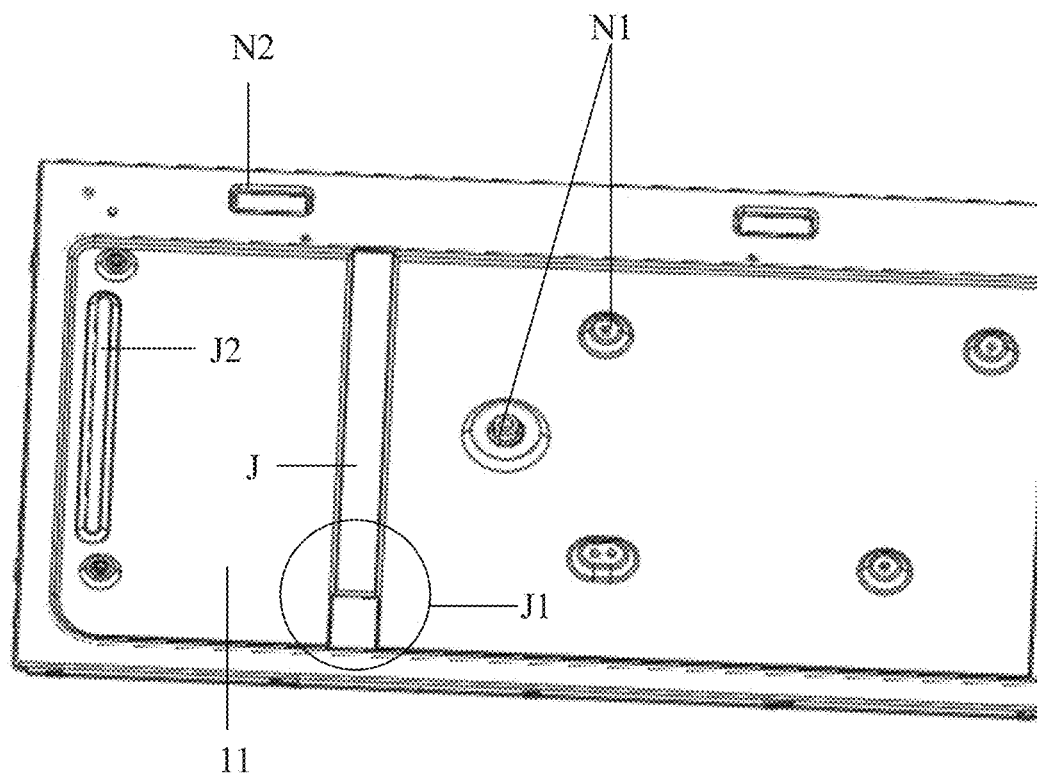
FIG. 30 is a schematic structural diagram of a backplane in a region G2 shown in FIG. 25.

Referring to FIG. 25 and FIG. 30, as shown in FIG. 30, FIG. 30 is a schematic structural diagram of a backplane in a region G2 shown in FIG. 25. The backplane 11 further includes a plurality of bosses N1 protruding towards the direction away from the display panel 14. The boss N1 is provided with a threaded hole.

In some embodiments, the plurality of bosses N1 include threaded holes of different sizes. The strength of the display module is ensured by fixing to other structures through the bosses N1. In addition, by disposing the bosses, a space is reserved between the backplane and the outer structure, such that the heat dispersion property is improved, the outer structure is prevented from a large area contact with the backplane, and the risk of a short circuit is reduced.

In addition, the backplane 11 further includes a bearing protrusion N2 protruding towards a side, proximal to the display panel, of the backplane 11. The bearing protrusion N2 is used to bear the backlight module.

In some embodiments, the side, distal from the display panel 14, of the backplane 11 is provided with a plurality of reinforcement ribs J protruding towards a direction in which the backplane is away from the display panel. The reinforcement rib J is used to reinforce the strength of the backplane and avoid deformation of the backplane.

In some embodiments, the reinforcement rib J is provided with an avoidance step J1, and a height of the avoidance step J1 is less than heights of other positions of the reinforcement rib J. the height is a size in a direction perpendicular to the backplane and away from the display panel. As such, a circuit (for example, a circuit connected to the light emitting assembly) on the back face of the display module passes through the avoidance step J1, and the flatness of the backplane is ensured.

In addition, the backplane 11 is further provided with an edge reinforcement rib J2 configured to further reinforce the strength of the backplane.

Illustratively, a reference region Z and a non-reference region R concaved towards a direction proximal to the backlight module 13 are disposed on a face, distal from the backlight module 13, of the plate body 111 of the backplane 11. The reference region Z includes a first reference region Z1 around the edges of plate body 111 and a second reference region Z2 surrounded by the non-reference region R, and a flatness of the reference region Z ranges from −1.1 mm to 0.2 mm. in FIG. 25, regions other than the first reference region Z1 around the edges of plate body 111 and the second reference region Z2 are the non-reference region R, and the reinforcement rib J2 and other structures are within the non-reference region R. The first reference region Z1 is located around the edges of the plate body 111, and a printed circuit board is disposed on the region. The second reference region Z2 is a top face of a boss structure on a center of the plate body 111, and is configured to be disposed with a logic plate (TCON). In some embodiments, the printed circuit board transmits a control signal generated by the TCON to a driving IC, such that the display panel normally displays.

In some embodiments, the printed circuit board transmits a data signal generated by the TCON to a driving IC, such that the display panel normally displays.

The −1.1 mm in the flatness of the reference region Z indicates that a position in the reference region Z protrudes 1.1 mm from the outer side of the display module relative to other positions in the reference region Z, and the 0.2 mm in the flatness of the reference region Z indicates that a position in the reference region Z protrudes 0.2 mm from the inner side of the display module relative to other positions in the reference region Z. The flatness is great, such that an accuracy of disposing some structures inner the display module is improved. For example, referring to FIG. 12, the third frame body 124 of the middle frame is disposed on the reference region Z (the third frame body 124 is disposed on the first reference region), such that the flatness of the bearing structure 122 in the middle frame is great, the flatness of the display panel is great, the light leak is avoided, and the display effect is improved.

Figure 31:
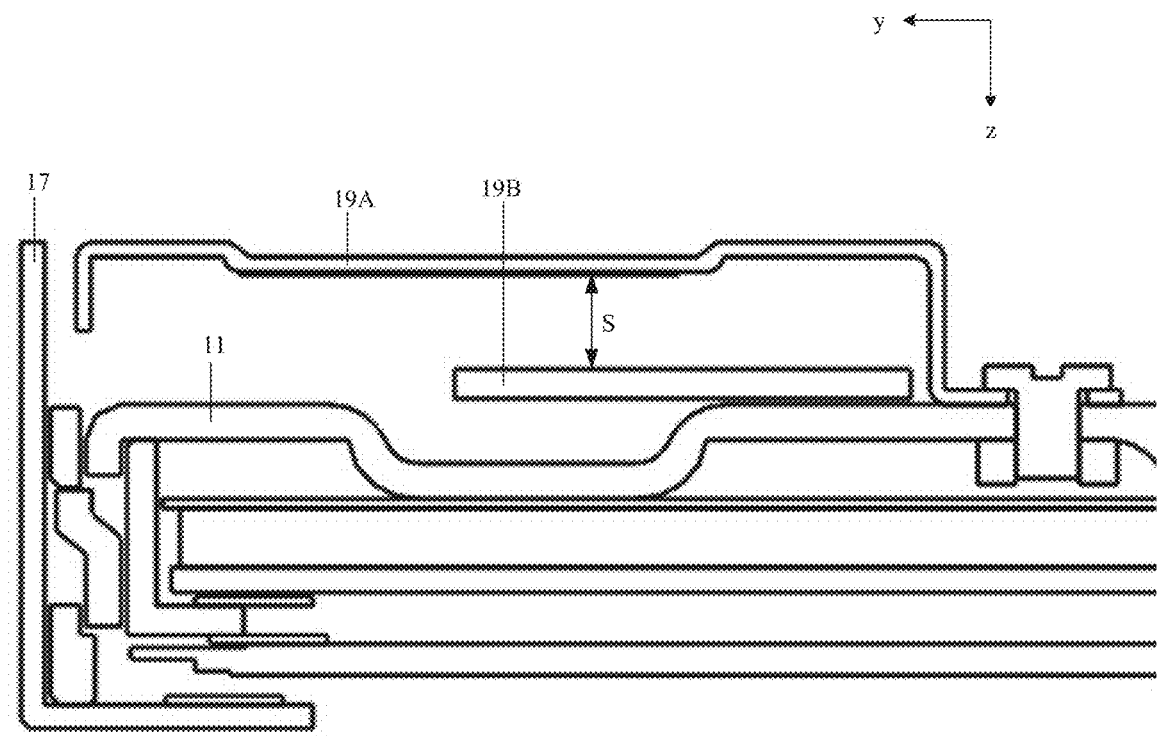
FIG. 31 is a section diagram at a position of E-E in FIG. 25.

Referring to FIG. 25 and FIG. 31, as shown in FIG. 31, FIG. 31 is a section diagram at a position of E-E in FIG. 25. The display module 10 further includes a protection cover plate 19A and a circuit board 19B on a side, distal from the display panel 14, of the backplane 11. The protection cover plate 19A covers the circuit board 19B, and a gap s is present between the protection cover plate 19A and the circuit board 19B.

In some embodiments, the gap s is greater than or equal to 2 mm. As such, the gap s between the protection cover plate 19A and the circuit board 19B causes the members on the circuit board 19B not to be in contact with the protection cover plate 19A. The gap s is greater than or equal to 2 mm, for example, 2 mm. By disposing the gap with such distance, the collision of the protection cover plate 19A and the circuit board 19B caused by deformation due to an external force is avoided.

Figure 32:
FIG. 32 is a schematic structural diagram of a protection cover plate shown in FIG. 25.

As shown in FIG. 32, FIG. 32 is a schematic structural diagram of a protection cover plate shown in FIG. 25. The protection cover plate 19A includes a metal plate 1901 and an insulating layer 1902 on a face, facing towards the circuit board 19B, of the metal plate 1901. The metal plate 1901 is an electroplated zinc steel plate with a thickness of the electroplated zinc steel plate is 0.5 mm. A thickness of the insulating layer 1902 is 0.1 mm. As such, a side, facing towards the circuit board 19B, of the metal plate 1901 is provided with the insulating layer 1902 to avoid static interference, such that an operating environment of the circuit board 19B is safe.

Figure 33:
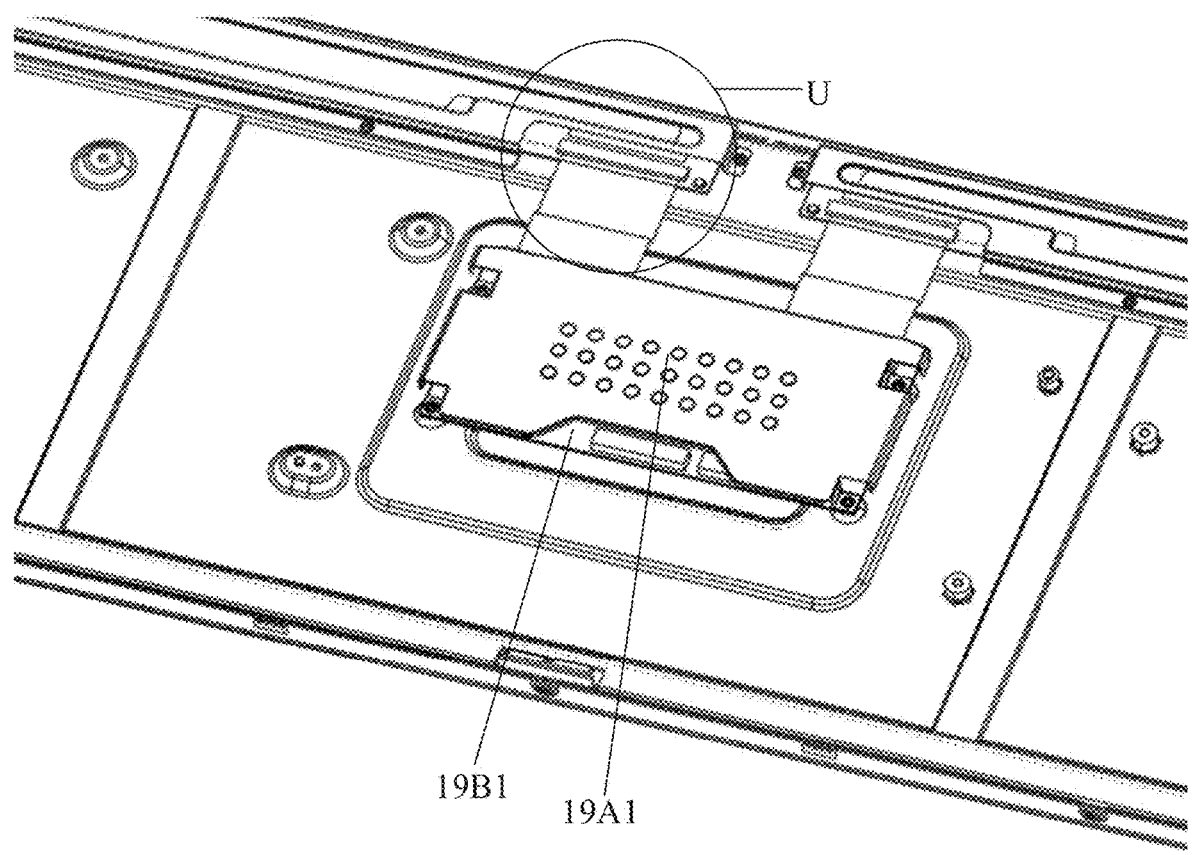
FIG. 33 is a schematic structural diagram of a circuit board and a protection cover plate in a region G3 shown in FIG. 25.
Figure 34:
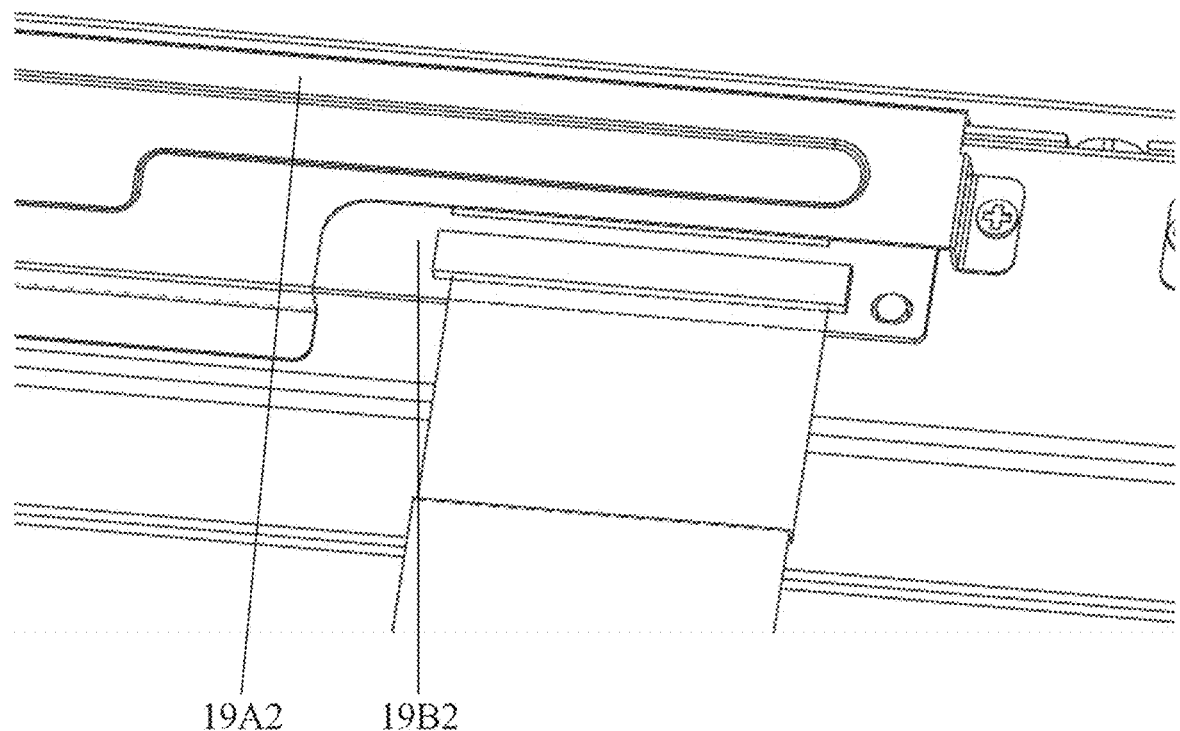
FIG. 34 is an enlarged diagram of a region Y shown in FIG. 33.

Referring to FIG. 33 and FIG. 34, as shown in FIG. 33, FIG. 33 is a schematic structural diagram of a circuit board and a protection cover plate in a region G3 shown in FIG. 25, and as shown in FIG. 34, FIG. 34 is an enlarged diagram of a region Y shown in FIG. 33. The circuit board 19B includes a logic plate 19B1 and a printed circuit board 19B2, and the protection cover plate 19A includes a logic plate cover plate 19A1 and a printed circuit board cover plate 19A2.

As shown in FIG. 20, the display module is rectangular, and a ratio of a length to a width of the display module is greater than or equal to 5:1. The display module being rectangular indicates that a profile of a display region is in a rectangular shape, and the ratio of the length to the width of the display module is a ratio of a length to a width of the display region. In the case that the display module is used in a vehicle-mounted display device, a ratio of a length s1 of a long side of the display module to a length s2 of a short side of the display module is greater than or equal to 5:1 to fit an application scenario of the display module.

In the present disclosure, the polygon is a triangle, a quadrilateral, a pentagon, a hexagon, an octagon, and the like. In some embodiments, for appearance, the polygon is axisymmetric. In some embodiments, the polygon is central symmetric. In some embodiments, the polygon is a rectangular polygon, a rounded polygon, or some vertexes of the polygon is set as the rounded corner. The rectangular polygon is a polygon in the conventional sense. All sides of the polygon are line segments.

It should be noted that the range in the embodiments includes endpoint values.

In summary, a display module is provided in the embodiments of the present disclosure. The display module includes a backplane, a middle frame, a backlight module, and a display panel. By setting angles between a bearing structure in the middle frame, a light guide plate, and an edge of the display panel, the display module has a view angle greater than or equal to 45°, such that the view angle of the display module is great, which facilitates viewing the display module at various angles by a user, solves a problem of less view angle of the display module in some practices, and achieves an effect of increasing the view angle of the display module. In addition, the view angle of the display module in the embodiments of the present disclosure is great, such that the display module is applicable to more scenarios, for example, various vehicles, various outdoor scenarios, and the like, the user can view the display module at a lower view angle, and other angles, and a use range is wide.

Figure 35:
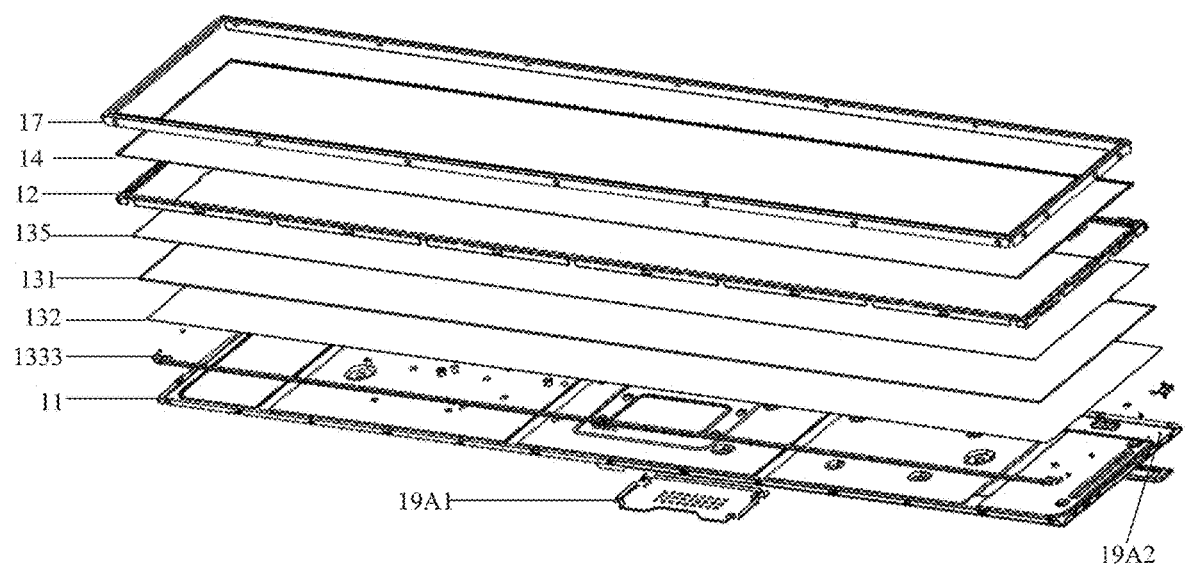
FIG. 35 is a structural explosion diagram of the display module shown in FIG. 1.

As shown in FIG. 35, FIG. 35 is a structural explosion diagram of the display module shown in FIG. 1.

The display module 10 includes a backplane 11, a light emitting 1333, a reflecting sheet 132, a light guide plate 131, a film material 135, a middle frame 12, a display panel 14, and a frame 17 that are laminated in a direction towards the display panel 14. A side, distal from the display panel 14, of the backplane is disposed with a logic plate cover plate 19A1 and a printed circuit board cover plate 19A2.

In addition, a display device is provided in the embodiments of the present disclosure, and the display device includes a control assembly and the display module in the above display module. The control assembly includes a system plate.

In some embodiments, the display device is a vehicle-mounted display device. The display device is may be a vehicle-mounted display device, a strip-shaped advertisement display screen, a vehicle-mounted strip-shaped screen, and the like. The vehicle-mounted strip-shaped screen is mainly used in a subway, a bus, a long-distance passenger car, a taxi rear screen, and the like. The vehicle-mounted strip-shaped screen includes Android system circuit integration which integrates multi functions, for example, advertising (video, text, pictures) display, bus guide display, and is mainly serve the public to provide more direct visual convenience for the public.

For requirements of the subway passengers, a development of a 48-inch high-brightness large-view vehicle-mounted strip-shaped screen is performed.

The display device further includes other assemblies for achieving various functions, such as a processor, a memory, a device interface, a radio frequency circuit, a camera assembly, an audio circuit, a positioning assembly, a power supply, one or more sensors (for example, an acceleration sensor, a gyroscope sensor, a pressure sensor, a fingerprint sensor, an optical sensor, a proximity sensor, and the like).

Described above are example embodiments of the present disclosure, and are not intended to limit the present disclosure. Any modifications, equivalent replacements, improvements and the like made within the spirit and principles of the present disclosure should be included within the scope of protection of the present disclosure.

The invention claimed is:

1. A display module, comprising: a backplane, a middle frame, a backlight module, and a display panel: wherein
the backlight module and the display panel are sequentially laminated on the backplane:
the middle frame comprises a first frame body and a bearing structure, wherein the first frame body surrounds the backlight module, the bearing structure is disposed on the first frame body and extends in a direction towards a center of the backlight module, and the backlight module and the display panel are respectively disposed on two faces of the bearing structure; and
the backlight module comprises a light guide plate, and the display module has a view angle greater than or equal to 45° on at least one side of the display module, wherein the view angle is a smaller one in a first angle and a second angle, the first angle being an included angle between a first link line and a normal line, and the second angle being an included angle between a second link line and the normal line, wherein on the at least one side of the display module, the first link line is a line between a first point on an edge of a light exiting face of the light guide plate and a second point on an edge of a display region of the display panel, the normal line is a straight line passing through the second point and perpendicular to the display region, the second link line is a line between a third point on an edge of a side, proximal to the backlight module, of the bearing structure and the second point, the first link line, the second link line, and the normal line are in a plane, and an extension direction of the edge of the display region of the second point is perpendicular to the plane of the first link line, the second link line, and the normal line.

2. The display module according to claim 1, further comprising: a protection cover plate and a circuit board on a side, distal from the display panel, of the backplane, wherein the protection cover plate covers the circuit board, and a gap is present between the protection cover plate and the circuit board.

3. The display module according to claim 1, wherein the display module is rectangular, and a ratio of a length to a width of the display module is greater than or equal to 5:1.

4. The display module according to claim 1, further comprising: a buffer structure: wherein the buffer structure comprises a first buffer structure between the middle frame and the backlight module, and a second buffer structure between the middle frame and the display panel, wherein the first buffer structure is adjacent to the middle frame and the backlight module, and the second buffer structure is adjacent to the middle frame and the display panel.

5. The display module according to claim 4, wherein the first buffer structure is attached to a face, proximal to the backlight module, of the bearing structure, and the second buffer structure is attached to a face, proximal to the display panel, of the bearing structure.

6. The display module according to claim 4, wherein
the backlight module further comprises a film material, wherein the film material is disposed on the light exiting face of the light guide plate, an orthogonal projection of the film material on a plane of the light guide plate is within the light guide plate, and at least one side of the light guide plate comprises an edge region not covered by the film material; and
an attaching region and a bearing boss are disposed on a face, facing towards the backlight module, of the bearing structure, and the first buffer structure comprises a first buffer sub-structure on the attaching region and a second buffer sub-structure on the bearing boss, wherein the first buffer sub-structure is adjacent to the film material, and the second buffer sub-structure is in contact with the edge region of the light guide plate.

7. The display module according to claim 4, wherein
the backplane comprises a plate body and a side wall extending from an edge of the plate body, and the buffer structure further comprises at least one L-shaped buffer structure, wherein the L-shaped buffer structure is disposed on the plate body of the backplane and is disposed between at least one corner of the backlight module and the side wall of the backplane.

8. The display module according to claim 7, wherein the backlight module further comprises a reflecting sheet on a face, distal from the display panel, of the light guide plate, wherein an abdication structure matching the L-shaped buffer structure is disposed on at least one corner of the reflecting sheet.

9. The display module according to claim 1, wherein
the backplane comprises a plate body and a side wall extending from an edge of the plate body, wherein the side wall comprises a protrusion structure; and
an opening is disposed in the first frame body, wherein the protrusion structure is configured to be inserted in the opening in the first frame body to connect the middle frame and the backplane.

10. The display module according to claim 9, wherein the middle frame further comprises a step structure and a third frame body, wherein the step structure is connected to the first frame body and the third frame body, and the third frame body is disposed on a side, facing towards the backlight module, of the first frame body and is opposite to the opening in the first frame body.

11. The display module according to claim 10, wherein the backlight module further comprises a light emitting assembly disposed on a second side of the middle frame, and the third frame body is disposed on sides other than the second side.

12. The display module according to claim 1, wherein the backlight module further comprises a light emitting assembly disposed on a side face of the light guide plate, wherein the light emitting assembly is not overlapped with an orthogonal projection of the light guide plate on a plane of the light exiting face of the light guide plate, and the light emitting assembly comprises a strip-shaped light emitting chip bearing substrate, a stop block, and a plurality of light emitting chips on the light emitting chip bearing substrate, wherein one side of the stop block is in contact with the light emitting chip bearing substrate, the other side of the stop block is in contact with the side face of the light guide plate, and a size of the stop block is greater than a size of the light emitting chip in a direction perpendicular to the side face of the light guide plate.

13. The display module according to claim 12, wherein the backplane comprises a plate body and a side wall extending from an edge of the plate body, wherein the light emitting chip bearing substrate is disposed on the side wall, a positioning protrusion extending towards the light guide plate is disposed at an edge, distal from the plate body, of the side wall, and the light emitting chip bearing substrate is disposed between the positioning protrusion and the plate body.

14. The display module according to claim 12, wherein a distance between the light emitting chip and the side face of the light guide plate ranges from 0.25 mm to 0.3 mm.

15. The display module according to claim 12, wherein
a terminal opening and a terminal stopping wall extending from an edge of the terminal opening are disposed in and on the backplane, wherein the terminal stopping wall is disposed on a side, distal from the display panel, of the backplane; and
the backlight module further comprises a backlight connection terminal, wherein the backlight connection terminal is electrically connected to the light emitting chip bearing substrate, and the backlight connection terminal protrudes from the terminal opening.

16. The display module according to claim 1, wherein the backlight module further comprises a film material, wherein the film material is disposed on the light exiting face of the light guide plate, at least one stop protrusion is disposed at an edge of the film material, the backplane comprises at least one stop opening in one to one correspondence to the at least one stop protrusion, wherein the stop protrusion is disposed in the stop opening.

17. The display module according to claim 16, wherein at least two types of the stop openings are defined, the at least two types of the stop openings comprise a first stop opening and a second stop opening, wherein in an extension direction of the edge of the film material, a length difference between the first stop opening and the corresponding stop protrusion is greater than a length difference between the second stop opening and the corresponding stop protrusion.

18. The display module according to claim 17, wherein the film material is in a rectangular shape, one second stop protrusion and two first stop protrusions on two sides of the one second stop protrusion are disposed on longer sides of the film material, and one first stop protrusion is disposed on each of two shorter sides of the film material.

19. A display device, comprising: a control assembly and a display module, wherein the display module comprises: a backplane, a middle frame, a backlight module, and a display panel; wherein
the backlight module and the display panel are sequentially laminated on the backplane;
the middle frame comprises a first frame body and a bearing structure, wherein the first frame body surrounds the backlight module, the bearing structure is disposed on the first frame body and extends in a direction towards a center of the backlight module, and the backlight module and the display panel are respectively disposed on two faces of the bearing structure; and
the backlight module comprises a light guide plate, and the display module has a view angle greater than or equal to 45° on at least one side of the display module, wherein the view angle is a smaller one in a first angle and a second angle, the first angle being an included angle between a first link line and a normal line, and the second angle being an included angle between a second link line and the normal line, wherein on the at least one side of the display module, the first link line is a line between a first point on an edge of a light exiting face of the light guide plate and a second point on an edge of a display region of the display panel, the normal line is a straight line passing through the second point and perpendicular to the display region, the second link line is a line between a third point on an edge of a side, proximal to the backlight module, of the bearing structure and the second point, the first link line, the second link line, and the normal line are in a plane, and an extension direction of the edge of the display region of the second point is perpendicular to the plane of the first link line, the second link line, and the normal line.

20. The display device according to claim 19, wherein the display device is a vehicle-mounted display device.

* * * * *